United States Patent
Usman et al.

(10) Patent No.: US 11,185,843 B2
(45) Date of Patent: Nov. 30, 2021

(54) ZIRCONIUM METAL-ORGANIC FRAMEWORK AND A METHOD OF CAPTURING CARBON DIOXIDE

(71) Applicant: King Fahd University of Petroleum and Minerals, Dhahran (SA)

(72) Inventors: Muhammad Usman, Dhahran (SA); Aasif Helal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 287 days.

(21) Appl. No.: 16/677,277

(22) Filed: Nov. 7, 2019

(65) Prior Publication Data

US 2021/0138433 A1  May 13, 2021

(51) Int. Cl.
*B01D 53/04* (2006.01)
*B01J 20/20* (2006.01)
*B01J 20/22* (2006.01)
*B01J 20/30* (2006.01)
*B01J 20/28* (2006.01)

(52) U.S. Cl.
CPC ............ *B01J 20/226* (2013.01); *B01D 53/04* (2013.01); *B01J 20/28061* (2013.01); *B01J 20/28064* (2013.01); *B01J 20/28071* (2013.01); *B01J 20/3078* (2013.01); *B01D 2253/204* (2013.01); *B01D 2253/306* (2013.01); *B01D 2253/311* (2013.01); *B01D 2257/504* (2013.01)

(58) Field of Classification Search
CPC .. B01D 53/02; B01D 53/04; B01D 2253/204; B01D 2253/306; B01D 2253/311; B01D 2253/504; Y02C 20/40; B01J 20/226; B01J 20/28061; B01J 20/28064; B01J 20/28071; B01J 20/3078
USPC ...................... 95/139, 900; 96/108; 423/230
See application file for complete search history.

(56) References Cited

U.S. PATENT DOCUMENTS

| 7,037,583 | B2 | 5/2006 | Furman et al. | |
|---|---|---|---|---|
| 10,201,803 | B2 | 2/2019 | Cohen et al. | |
| 2012/0259135 | A1* | 10/2012 | Yaghi | B01J 20/226 556/132 |
| 2021/0002304 | A1* | 1/2021 | Helal | G01N 21/314 |

FOREIGN PATENT DOCUMENTS

| CN | 107549871 A | 1/2018 |
|---|---|---|
| CN | 107722289 A | 2/2018 |

OTHER PUBLICATIONS

Gui, et al. ; Pore surface engineering in a zirconium metal-organic framework via thiol-ene reaction ; Journal of Solid State Chemistry, vol. 223 ; pp. 79-83 ; Mar. 2015 ; 4 Pages.

Kronast, et al. ; Gated Channels and Selectivity Tuning of CO2 over N2 Sorption by Post-Synthetic Modification of a UiO-66-Type Metal-Organic Framework ; Chemistry A European Journal ; Aug. 2, 2016 ; 4 Pages.

Zhaodong, et al. ; Synthesis of Zr-based metal organic frameworks and itsCO2/N2captureandseparation ; New Chemical Materials vol. 46, No. 10 ; 2018 ; 3 Pages.

Li, et al. ; Deep eutectic solvents appended to UiO-66 type metal organic frameworks: Preserved open metal sites and extra adsorption sites for CO2 capture ; Applied Surface Science, vol. 480 ; pp. 770-778 ; Jun. 30, 2019 ; 5 Pages.

* cited by examiner

*Primary Examiner* — Frank M Lawrence, Jr.
(74) *Attorney, Agent, or Firm* — Oblon, McClelland, Maier & Neustadt, L.L.P.

(57) ABSTRACT

A zirconium metal-organic framework, which is a coordination product formed between zirconium ion clusters and a linker that links together adjacent zirconium ion clusters, wherein the linker is of formula (I)

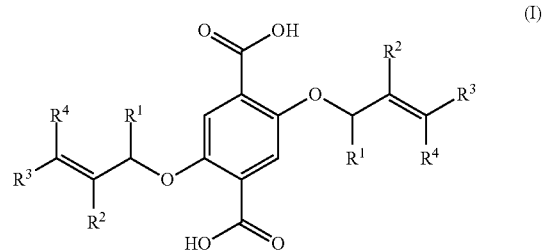

wherein $R^1$ is hydrogen or an optionally substituted alkyl, and $R^2$ to $R^4$ are independently hydrogen, an optionally substituted alkyl, an optionally substituted aryl, or an optionally substituted arylalkyl. A method of capturing $CO_2$ from a gas mixture with the zirconium metal-organic framework.

20 Claims, 6 Drawing Sheets

ZIRCONIUM METAL-ORGANIC FRAMEWORK AND A METHOD OF CAPTURING CARBON DIOXIDE

BACKGROUND OF THE INVENTION

Field of the Invention

The present invention relates to a zirconium metal-organic framework (Zr-MOF), and methods of capturing carbon dioxide ($CO_2$) with the Zr-MOF.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In addition to natural biological processes, carbon dioxide can be captured by chemical and physical methods. However, current efforts are not enough to control global warming and to mitigate environmental challenges caused by high $CO_2$ levels. Research related to artificial carbon capture is in progress, however several shortcomings to date, such as the corrosive nature of many adsorbents and low capture uptake, leave plenty of room for improvement. Therefore, there is a need to produce new materials for carbon capture with improved characteristics.

Metal-organic frameworks (MOFs) are extended crystalline porous materials that are constructed from metal ions and multifunctional coordinating organic linkers. See Yaghi, O. M. et al. Reticular synthesis and the design of new materials. *Nature* 423, 705 (2003); and Li, B. et al. Emerging multifunctional metal-organic framework materials. *Advanced Materials* 28, 8819-8860 (2016), each incorporated herein by reference in their entirety. MOFs are used in a variety of applications owing to their diverse, porous structures and large surface areas, such as in the fields of gas adsorption/storage, catalysis, separation, biomedicine and drug delivery, adsorption of organic molecules, dyes, alkylaromatics and phenols, electrode materials, as carriers for nanomaterials, luminescence, etc. See Sumida, K. et al. Carbon dioxide capture in metal-organic frameworks. *Chemical reviews* 112, 724-781 (2011); Choi, K. M., Na, K., Somorjai, G. A. & Yaghi, O. M. Chemical environment control and enhanced catalytic performance of platinum nanoparticles embedded in nanocrystalline metal-organic frameworks. *Journal of the American Chemical Society* 137, 7810-7816 (2015); Yoon, M., Srirambalaji, R. & Kim, K. Homochiral metal-organic frameworks for asymmetric heterogeneous catalysis. *Chemical reviews* 112, 1196-1231 (2011); Li, J.-R., Sculley, J. & Zhou, H.-C. Metal-organic frameworks for separations. *Chemical reviews* 112, 869-932 (2011); Horcajada, P. et al. Metal-organic frameworks in biomedicine. *Chemical reviews* 112, 1232-1268 (2011); Huang, X.-X. et al. Hierarchically mesostructured MIL-101 metal-organic frameworks: supramolecular template-directed synthesis and accelerated adsorption kinetics for dye removal. *Cryst Eng Comm* 14, 1613-1617 (2012); Adeyemo, A. A., Adeoye, I. O. & Bello, O. S. Metal organic frameworks as adsorbents for dye adsorption: overview, prospects and future challenges. *Toxicological & Environmental Chemistry* 94, 1846-1863 (2012); Zhu, Y. et al. 3D lanthanide metal-organic frameworks constructed from 2, 6-naphthalenedicarboxylate ligand: synthesis, structure, luminescence and dye adsorption. *Journal of Solid State Chemistry* 251, 248-254 (2017); Haque, E., Jun, J. W., Talapaneni, S. N., Vinu, A. & Jhung, S. H. Superior adsorption capacity of mesoporous carbon nitride with basic CN framework for phenol. *Journal of Materials Chemistry* 20, 10801-10803 (2010); Mendecki, L. & Mirica, K. A. Conductive Metal-Organic Frameworks as Ion-to-Electron Transducers in Potentiometric Sensors. *ACS applied materials & interfaces* 10, 19248-19257 (2018); Hermes, S., Schröder, F., Chelmowski, R., Wöll, C. & Fischer, R. A. Selective nucleation and growth of metal-organic open framework thin films on patterned COOH/CF3-terminated self-assembled monolayers on Au (111). *Journal of the American Chemical Society* 127, 13744-13745 (2005); Allendorf, M., Bauer, C., Bhakta, R. & Houk, R. Luminescent metal-organic frameworks. *Chemical Society Reviews* 38, 1330-1352 (2009), each incorporated herein by reference in their entirety. It is well established that Zr(IV)-based MOFs with dicarboxylate ligands have high thermal stability, atmospheric-moisture resistance and porosity. Lillerud and co-workers first synthesized a Zirconium based UiO-66 (University of Oslo) MOF. See Cavka, J. H. et al. A new zirconium inorganic building brick forming metal organic frameworks with exceptional stability. *Journal of the American Chemical Society* 130, 13850-13851 (2008); and Valenzano, L. et al. Disclosing the complex structure of UiO-66 metal organic framework: a synergic combination of experiment and theory. *Chemistry of Materials* 23, 1700-1718 (2011), each incorporated herein by reference in their entirety. The high stabilities of these zirconium-based MOFs are attributed to the strong Zr—O bonds on the highly charged and oxophilic Zr(IV) cations, and the high coordination numbers of each metal ion. See Schaate, A. et al. A Novel Zr-Based Porous Coordination Polymer Containing Azobenzenedicarboxylate as a Linker. *European Journal of Inorganic Chemistry* 2012, 790-796 (2012); and Bai, Y. et al. Zr-based metal-organic frameworks: design, synthesis, structure, and applications. *Chemical Society Reviews* 45, 2327-2367 (2016), each incorporated herein by reference in their entirety.

Several post-synthetic and pre-synthetic functionalization strategies have been reported on UiO-66 to form derivatives with improved stability for several applications. See Zhu, J., Wu, L., Bu, Z., Jie, S. & Li, B.-G. Polyethyleneimine-Modified UiO-66-NH2(Zr) Metal-Organic Frameworks: Preparation and Enhanced CO2 Selective Adsorption. *ACS Omega* 4, 3188-3197 (2019); Prasetya, N., Donose, B. C. & Ladewig, B. P. A new and highly robust light-responsive Azo-UiO-66 for highly selective and low energy post-combustion CO2 capture and its application in a mixed matrix membrane for CO2/N2 separation. *Journal of Materials Chemistry A* 6, 16390-16402 (2018); Molavi, H., Eskandari, A., Shojaei, A. & Mousavi, S. A. Enhancing CO2/N2 adsorption selectivity via post-synthetic modification of NH2-UiO-66(Zr). *Microporous and Mesoporous Materials* 257, 193-201 (2018); Erkartal, M. & Sen, U. Boronic Acid Moiety as Functional Defect in UiO-66 and Its Effect on Hydrogen Uptake Capacity and Selective CO2 Adsorption: A Comparative Study. *ACS Applied Materials & Interfaces* 10, 787-795 (2018); Hu, Z., Nalaparaju, A., Peng, Y., Jiang, J. & Zhao, D. Modulated Hydrothermal Synthesis of UiO-66 (Hf)-Type Metal-Organic Frameworks for Optimal Carbon Dioxide Separation. *Inorganic chemistry* 55, 1134-1141 (2016); Rada, Z. H., Abid, H. R., Sun, H. & Wang, S. Bifunctionalized metal organic frameworks, UiO-66-NO2-N (N=—NH2, —(OH) 2, —(COOH) 2), for enhanced adsorption and selectivity of CO2 and N2. *Journal* of Chemical & Engineering Data 60, 2152-2161 (2015); Li, L.-J. et al. Grafting alkylamine in UiO-66 by charge-assisted coordination bonds for carbon dioxide capture from high-humidity flue gas. *Journal of Materials Chemistry A* 3, 21849-21855 (2015); Hu, Z. et al. Combination of optimization and metalated-ligand exchange: an effective approach to functionalize UiO-66 (Zr) MOFs for CO2 separation. *Chemistry—A European Journal* 21, 17246-17255 (2015); Ethiraj, J. et al. Carbon dioxide adsorption in amine-functionalized mixed-ligand metal-organic frameworks of UiO-66 topology. *ChemSusChem* 7, 3382-3388 (2014); Zhang, W., Huang, H., Zhong, C. & Liu, D. Cooperative effect of temperature and linker functionality on CO2 capture from industrial gas mixtures in metal-organic frameworks: a combined experimental and molecular simulation study. *Physical Chemistry Chemical Physics* 14, 2317-2325 (2012); Cmarik, G. E., Kim, M., Cohen, S. M. & Walton, K. S. Tuning the Adsorption Properties of UiO-66 via Ligand Functionalization. *Langmuir* 28, 15606-15613 (2012); and Yu, G. et al. Constructing Connected Paths between UiO-66 and PIM-1 to Improve Membrane CO2 Separation with Crystal-Like Gas Selectivity. *Advanced Materials* 0, 1806853, each incorporated herein by reference in their entirety. However, there is still a need for new MOF materials with modified ligands that can be used in carbon dioxide capture processes.

In view of the forgoing, there is a need for temperature- and solvent-stable zirconium metal-organic frameworks (Zr-MOF) with suitable surface properties for selective adsorption of $CO_2$ gas for $CO_2$ capture technologies.

SUMMARY OF THE INVENTION

Accordingly, it is one object of the present invention to provide a zirconium metal-organic framework, which is a coordination product formed between (i) zirconium ion clusters and (ii) a linker that links together adjacent zirconium ion clusters, wherein the linker is of formula (I)

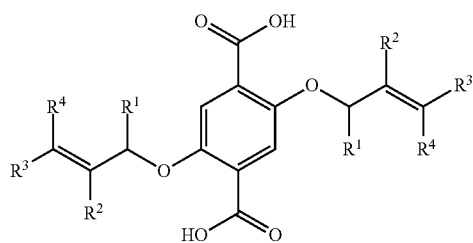

(I)

wherein $R^1$ is hydrogen or an optionally substituted alkyl, and $R^2$ to $R^4$ are independently hydrogen, an optionally substituted alkyl, an optionally substituted aryl, or an optionally substituted arylalkyl.

In some embodiments, $R^1$ is hydrogen.

In some embodiments, $R^2$ to $R^4$ are each hydrogen.

In some embodiments, the linker is

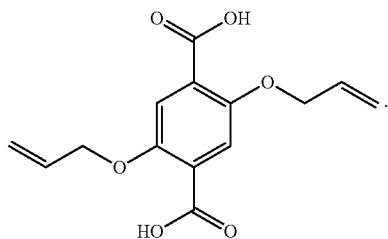

In some embodiments, the zirconium metal-organic framework has a zirconium ion to linker molecular ratio of 0.5:1 to 2:1.

In some embodiments, the zirconium ion clusters are of formula $[Zr_6O_4(OH)_4]^{12+}$.

In some embodiments, the zirconium metal-organic framework is isoreticular with metal-organic framework UiO-66.

In some embodiments, the zirconium metal-organic framework has a BET surface area of 300 to 600 $m^2/g$.

In some embodiments, the zirconium metal-organic framework has a pore volume of 0.1 to 0.25 $cm^3/g$.

In some embodiments, the zirconium metal-organic framework has a $CO_2$ uptake capacity of 75 to 90 $cm^3/g$ at 273 K, 40 to 60 $cm^3/g$ at 298 K, and 20 to 35 $cm^3/g$ at 313 K, each at 760 Torr.

In some embodiments, the zirconium metal-organic framework has an ideal selectivity of $CO_2/N_2$ of 55 to 75, and an ideal selectivity of $CO_2/CH_4$ of 10 to 22.

It is another object of the present disclosure to provide a method of making the zirconium metal-organic framework, which involves mixing a zirconium(IV) salt and the linker of formula (I) in a polar aprotic solvent to form a complexation mixture, and heating the complexation mixture at 100 to 150° C. for 12 to 72 hours.

In some embodiments, a concentration of the zirconium (IV) salt in the complexation mixture is 0.01 to 0.03 M and a concentration of the linker of formula (I) in the complexation mixture is 0.005 to 0.025 M.

In some embodiments, the zirconium(IV) salt is $ZrCl_4$ and the polar aprotic solvent is dimethylformamide.

It is yet another object of the present disclosure to provide a method of capturing $CO_2$ from a gas mixture, involving contacting the gas mixture with the zirconium metal-organic framework to adsorb at least a portion of the $CO_2$ into the zirconium metal-organic framework, thereby forming a loaded zirconium metal-organic framework and a gas stream depleted in $CO_2$ compared to the gas mixture.

In some embodiments, the gas mixture further includes at least one other gas selected from the group consisting of hydrogen, oxygen, nitrogen, methane, and carbon monoxide.

In some embodiments, the gas mixture is a pre-combustion gas mixture that contains 15 to 50 vol. % of $CO_2$, based on a total volume of the gas mixture.

In some embodiments, the gas mixture is a post-combustion gas mixture that contains 5 to 15 vol. % of $CO_2$, based on a total volume of the gas mixture.

In some embodiments, the gas mixture has a temperature of −5 to 50° C.

In some embodiments, the gas stream depleted in $CO_2$ contains at least 25% less $CO_2$ by volume compared to a volume of $CO_2$ present in the gas mixture.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
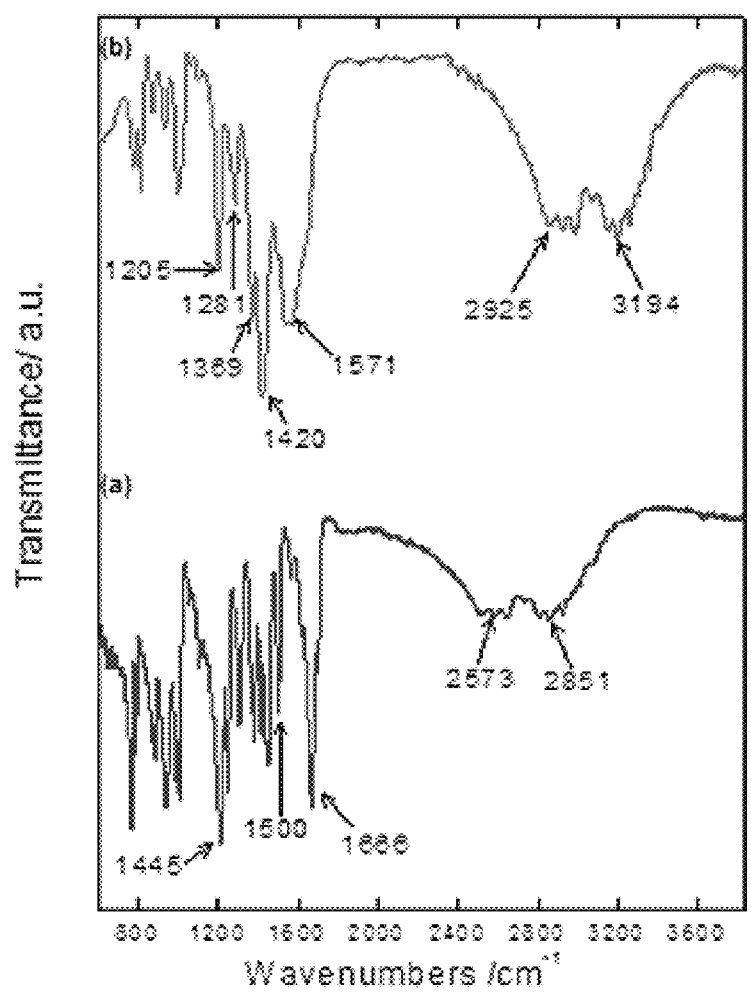
FIG. 1 illustrates the FTIR spectra of (a) $H_2L$, and (b) Bisallyloxy-UiO-66.

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, saturated aliphatic fragment having 1 to 26 carbon atoms, (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, etc.) and specifically includes, but is not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, tetradecyl, pentadecyl, hexadecyl, heptadecyl, octadecyl, nonadecyl, eicosyl, guerbet-type alkyl groups (e.g., 2-methylpentyl, 2-ethylhexyl, 2-propylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), as well as cyclic alkyl groups (cycloalkyls) such as cyclopropyl, cyclobutyl, cyclopentyl, cyclohexyl, norbornyl, and adamantyl.

The term "aryl" means a carbocyclic aromatic monocyclic group containing 6 carbon atoms which may be further fused to a second 5- or 6-membered carbocyclic group which may be aromatic, saturated or unsaturated. Aryl includes, but is not limited to, phenyl, anthracenyl, indanyl, 1-naphthyl, 2-naphthyl, and tetrahydronaphthyl. The fused aryls may be connected to another group either at a suitable position on the cycloalkyl/cycloalkenyl ring or the aromatic ring.

The term "arylalkyl", as used herein, refers to a straight or branched chain alkyl moiety (as defined above) that is substituted by an aryl group (as defined above), examples of which include, but are not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkoxy" refers to an —O-alkyl group. Example alkoxy groups include, but are not limited to, methoxy, ethoxy, propoxy (e.g., n-propoxy and isopropoxy), and t-butoxy.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—NH$_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —SO$_2$NH$_2$), substituted sulfonamide (e.g., —SO$_2$NHalkyl, —SO$_2$NHaryl, —SO$_2$NHarylalkyl, or cases where there are two substituents on one nitrogen selected from alkyl, aryl, or alkylalkyl), nitro, cyano, carboxy, unsubstituted amide (i.e. —CONH$_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

Throughout the specification and the appended claims, a given chemical formula or name shall encompass all isomers (stereo and optical isomers and racemates) thereof where such isomers exist. Unless otherwise indicated, all chiral (enantiomeric and diastereomeric) and racemic forms are within the scope of the disclosure. Many geometric isomers of C=C double bonds, C=N double bonds, ring systems, and the like can also be present in the compounds, and all such stable isomers are contemplated in the present disclosure. Cis- and trans- (or E- and Z-) geometric isomers of the compounds of the present disclosure are described and may be isolated as a mixture of isomers or as separated isomeric forms. The present compounds can be isolated in optically active or racemic forms. Optically active forms may be prepared by resolution of racemic forms or by synthesis from optically active starting materials. All processes used to prepare compounds of the present disclosure and intermediates made therein are considered to be part of the present disclosure. When enantiomeric or diastereomeric products are prepared, they may be separated by conventional methods, for example, by chromatography, fractional crystallization, or through the use of a chiral agent. Depending on the process conditions the end products of the present disclosure are obtained either in free (neutral) or salt form. Both the free form and the salts of these end products are within the scope of the disclosure. If so desired, one form of a compound may be converted into another form. A free base or acid may be converted into a salt; a salt may be converted into the free compound or another salt; a mixture of isomeric compounds of the present disclosure may be separated into the individual isomers. Compounds of the present disclosure, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the disclosure. Further, a given chemical formula or name shall encompass all conformers, rotamers, or conformational isomers thereof where such isomers exist. Different conformations can have different energies, can usually interconvert, and are very rarely isolatable. There are some molecules that can be isolated in several conformations. For example, atropisomers are isomers resulting from hindered rotation about single bonds where the steric strain barrier to rotation is high enough to allow for the isolation of the conformers. It should be understood that all conformers, rotamers, or conformational isomer forms, insofar as they may exist, are included within the present disclosure.

As used herein "metal-organic frameworks" or MOFs are compounds having a lattice structure made from (i) a cluster of metal ions as vertices ("cornerstones")("secondary building units" or SBUs) which are metal-based inorganic groups, for example metal oxides and/or hydroxides, linked together by (ii) organic linkers. The linkers are usually at least bidentate ligands which coordinate to the metal-based inorganic groups via functional groups such as carboxylates and/or amines. MOFs are considered coordination polymers made up of (i) the metal ion clusters and (ii) linker building blocks.

The term "isoreticular" as used herein is given its ordinary meaning, and thus refers to metal-organic frameworks (MOFs) which have the same network topology.

The term "ideal selectivity" refers to a ratio between the uptake capacity of gases, and can be calculated for example using single component isotherms by Henry's law.

Zirconium Metal-Organic Framework (Zr-MOF)

The present disclosure provides a zirconium metal-organic framework (Zr-MOF) with suitable surface properties (e.g., BET surface area, pore volume, etc.) which enable selective adsorption of $CO_2$ gas for $CO_2$ capture technologies. The Zr-MOF disclosed herein is easy to manufacture for example using pre-synthetic ligand modification strategies, and is stable under a wide range of pH, temperature, and solvent conditions.

Generally, metal-organic frameworks (MOFs) are composed of two major components, (i) a cluster of metal ions in the form of inorganic oxides and/or hydroxides often called a "cornerstone" or "secondary building units" (SBUs) and (ii) an organic "linker" which coordinates to/connects two (or more) of the metal ion clusters to form a coordinated network. The structures may be one- two- or three-dimensional. As such, MOFs may often be referred to as hybrid organic-inorganic materials. The organic linkers are typically multivalent (e.g., di-, tri-, tetra-valent) ligands, and the choice of metal ion and linker dictates the structure and hence properties of the MOF. For example, the metal's coordination preference influences the size and shape of pores by dictating how many ligands can bind to the metal and in which orientation. MOFs usually contain pores (cages) which are present in the voids between the coordinated network of metal ion clusters and organic linker compounds. The pores are typically micropores having a diameter of 2 nm or less, preferably 1.5 nm or less, preferably 1 nm or less, or mesopores having a diameter of 2 to 50 nm, preferably 3 to 45 nm, preferably 4 to 40 nm, preferably 5 to 35 nm, preferably 6 to 30 nm.

The MOF of the present disclosure is preferably based on zirconium ions (made from zirconium ion clusters), referred to herein as a zirconium metal-organic framework (Zr-MOF). The Zr-MOF herein is intended to cover any MOF which contains predominantly zirconium ions with respect to the total metal ion content. The Zr-MOFs of the disclosure include zirconium ion clusters (cornerstones) which are zirconium inorganic groups, typically zirconium ions connected by bridging oxygen groups, bridging hydroxide groups, or both. These zirconium ion clusters are further coordinated to at least one linker. In some cases, the zirconium ion clusters may be further connected to non-bridging modulator species, complexing reagents or ligands (e.g. sulfates or carboxylates such as formate, benzoate, acetate, etc.) and/or solvent molecules (e.g., $H_2O$). The idealized zirconium ion cluster is considered to be a hexanuclear zirconium ion cluster based on an octahedron of zirconium ions ($Zr^{4+}$) which are $\mu_3$-bridged by $O^{2-}$ and/or $OH^-$ ions via the faces of the octahedron and further saturated by coordinating ligands containing oxygen atoms like carboxylate groups. Preferably, each zirconium ion cluster is coordinated by between 6 and 12 carboxylate groups, or between 8 and 11 carboxylate groups, or 10 carboxylate groups (preferentially as close as possible to 12 carboxylate groups), the carboxylate groups being from the linker and/or a modulator. However, in practice, there is a degree of flexibility in the structure of the zirconium ion cluster.

The zirconium ion cluster core structure herein (carboxylate ligands and overall charges not represented) may be of formula $[Zr_6O_x(OH)_{8-x}]$ wherein x is in the range 0 to 8, preferably 1 to 7, preferably 2 to 6, preferably 3 to 5, preferably 4. For example, the zirconium ion cluster core structure may be represented by the formula $[Zr_6O_4(OH)_4]$. In preferred embodiments, the zirconium ion clusters (with charges represented) are of formula $[Zr_6O_4(OH)_4]^{12+}$, which when coordinated to 12 carboxylate ligands (represented by "COO", originating from the linker and/or a modulator) in a coordination product, may be of formula $[Zr_6(\mu_3\text{-}O)_4(\mu_3\text{-}OH)_4(COO)_{12}]$. In Zr-MOFs which include zirconium ion clusters coordinated to fewer than 12 carboxylate ligands, each missing carboxylate ligand may be replaced by a pair of OH⁻/H₂O ligands to balance the charge. For example, zirconium ion clusters coordinated to 11-carboxylate ligands may be of formula [Zr₆(μ₃-O)₄(μ₃-OH)₄(OH)(H₂O)(COO)₁₁], zirconium ion clusters coordinated to 10-carboxylate ligands may be of formula [Zr₆(μ₃-O)₄(μ₃-OH)₄(OH)₂(H₂)₂(COO)₁₀], zirconium ion clusters coordinated to 8-carboxylate ligands may be of formula [Zr₆(μ₃-O)₄(μ₃-OH)₄(OH)₄(H₂O)₄(COO)₈], and zirconium ion clusters coordinated to 6-carboxylate ligands may be of formula [Zr₆(μ₃-O)₄(μ₃-OH)₄(OH)₆(H₂O)₆(COO)₆].

The zirconium molecular organic frameworks of the present disclosure preferably contain greater than 50 wt. % of zirconium ions, preferably greater than 60 wt. % of zirconium ions, preferably greater than 70 wt. % of zirconium ions, preferably greater than 80 wt. % of zirconium ions, preferably greater than 85 wt. % of zirconium ions, preferably greater than 90 wt. % of zirconium ions, preferably greater than 95 wt. % of zirconium ions, preferably greater than 99 wt. % of zirconium ions, preferably 100 wt. % of zirconium ions, based on a total weight of metal ions present. If additional metal ions are present (other than zirconium ions) these may be present in an amount of less than 50 wt. %, preferably less than 40 wt. %, preferably less than 30 wt. %, preferably less than 20 wt. %, preferably less than 15 wt. %, preferably less than 10 wt. %, preferably less than 5 wt. %, preferably less than 1 wt. %, based on a total weight of metal ions. Additional metal ions may include, but are not limited to, ions of hafnium, titanium, and cerium. Such mixed metal MOFs may be prepared using methods known by those of ordinary skill in the art, including, but not limited to, post-synthetic metal exchanges.

In preferred embodiments, the zirconium metal-organic framework herein is isoreticular with metal-organic framework UiO-66. UiO-66 is an archetypal zirconium-based metal-organic framework that is constructed from hexanuclear zirconium oxide/hydroxide ion clusters as secondary building units (SBUs) and 1,4-benzenedicarboxylate (BDC) linkers. UiO-66 is constructed by linking 12-connected [Zr₆(μ₃-O)₄(μ₃-OH)₄(COO)₁₂] clusters with linear BDC linkers into a network with face centered cubic (fcu) topology. UiO-66 possesses two types of micropores, tetrahedral (0.7 nm) and octahedral (0.9 nm), with a BET surface area of 1180 to 1240 m²/g and a pore volume of about 0.44 cm³/g.

The Zr-MOF of the present disclosure is preferably of the UiO-66 type, having the same crystal structure and connectivity (topology) as UiO-66, differing only in the functionalization of the BDC-type linker used in the synthesis. Thus, the Zr-MOF of the present disclosure differs from UiO-66 by the presence of its functionalized framework, which as will become clear, effects its surface properties, reactivity, and ultimately its cation/anion sensing properties.

In addition to the zirconium ion clusters (cornerstones), the Zr-MOFs of the present disclosure are formed from at least one linker, which may be bidentate, tridentate, or tertadentate, and which links together adjacent zirconium ion clusters to form the coordinated network. In preferred embodiments, the linker is of formula (I)

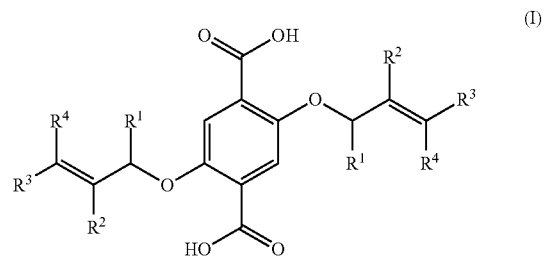

wherein:
R¹ is hydrogen or an optionally substituted alkyl, and
R² to R⁴ are independently hydrogen, an optionally substituted alkyl, an optionally substituted aryl, or an optionally substituted arylalkyl.

In some embodiments, R¹ is hydrogen or an optionally substituted C₁ to C₆ alkyl, preferably an optionally substituted C₂ to C₅ alkyl, preferably an optionally substituted C₃ to C₄ alkyl, for example, hydrogen, methyl, or ethyl. In preferred embodiments, R¹ is hydrogen.

In some embodiments, R² to R⁴ are independently hydrogen or an optionally substituted alkyl, preferably an optionally substituted C₁ to C₆ alkyl, preferably an optionally substituted C₂ to C₅ alkyl, preferably an optionally substituted C₃ to C₄ alkyl. In some embodiments, one of R² to R⁴ is an optionally substituted alkyl (e.g., methyl) while the remainder are hydrogen. For example, R² may be a methyl and R³ and R⁴ may each be hydrogen. In some embodiments, two of R² to R⁴ is an optionally substituted alkyl (e.g., methyl) while the remainder is hydrogen. For example, R³ and R⁴ may be a methyl and R² may be hydrogen. In preferred embodiments, R¹ to R⁴ are hydrogen.

The zirconium metal-organic framework may have a zirconium ion to linker molecular ratio of 0.5:1 to 2:1, preferably 0.55:1 to 1.8:1, preferably 0.6:1 to 1.6:1, preferably 0.7:1 to 1.4:1, preferably 0.8:1 to 1.2:1, preferably 1:1.

The zirconium metal-organic framework may be constructed using a single linker or a mixture of two or more linkers. For example, a mixture of two or more linkers that fall within the general formula (I) may be used to make the Zr-MOF. Alternatively a mixture of two or more linkers may be used, whereby at least one linker falls within the general formula (I) and at least one linker that falls outside of general formula (I), for example 1,4-benzenedicarboxylate (BDC), 2-amino-1,4-benzenedicarboxylic acid (NH₂-BDC), 2-bromo-1,4-benzenedicarboxylic acid (Br-BDC), and 2-nitro-1,4-benzenedicarboxylic acid (NO₂-BDC), just to name a few. It is preferred, however, that the Zr-MOF of the present disclosure is the coordination product resulting from use a single linker.

In preferred embodiments, the linker is

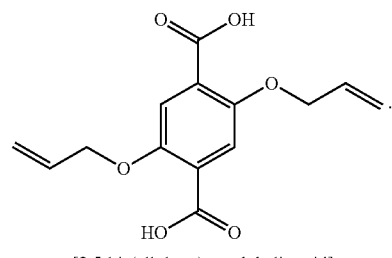

[2,5-bis(allyloxy)terephthalic acid]

The linker of formula (I) may be synthesized or otherwise obtained by methods known to those of ordinary skill in the art. For example, the linker of formula (I) may be obtained starting from 2,5-dihydroxyterephthalic acid.

Briefly, 2,5-dihydroxyterephthalic acid may be esterified under standard conditions (e.g., acid catalyzed) with an alcohol of formula (II), to produce a dihydroxy diester compound of formula (III)

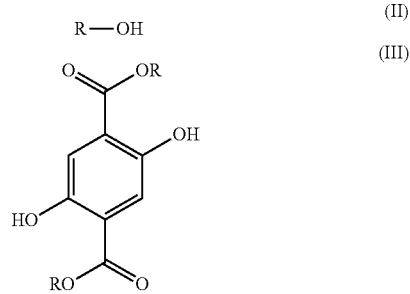

where R is an optionally substituted alkyl (e.g., methyl, ethyl, etc.), and optionally substituted aryl (e.g., phenyl), an optionally substituted arylalkyl (e.g., benzyl, p-methoxybenzyl, etc.), or any other group that is known to form an ester protecting group that may be subsequently cleaved to provide a carboxylic acid. Preferably R is an optionally substituted alkyl group, preferably methyl or ethyl, preferably methyl.

The compound of formula (V) may then be formed by reacting the dihydroxy diester compound of formula (III) with at least 2 molar equivalents of an alkene of formula (IV)

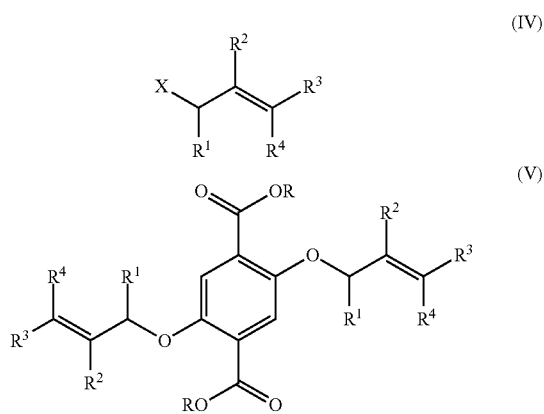

wherein X is a leaving group, for example, Cl, Br, I, tosylate (—OTs), or trifluoromethanesulfonate (—OTf), and wherein R, $R^1$, $R^2$, $R^3$, and $R^4$ are as defined previously. Such and alkenylation reaction may be performed using any procedures known to those of ordinary skill in the art, including, but not limited to, room temperature conditions, elevated temperature conditions, microwave conditions, in the presence of a base (e.g., $Na_2CO_3$, $K_2CO_3$, NaH, etc.). Preferably, the alkenylation reaction is performed by stirring the compounds of formulae (III and IV) in a polar aprotic solvent (e.g., acetonitrile, DMF, NMP, THF, DMSO, PC etc.), in the presence of the base at reflux conditions (e.g., 82° C. for acetonitrile).

Cleavage of the R group from the compound of formula (V) under suitable conditions may then form the linker of formula (I). Conditions suitable for the cleavage of the R group depend on the nature of R (and the other substituents present). For example, when R is an alkyl group having 1 to 3 carbon atoms, cleavage of R may be performed under standard saponification conditions such as using water, an alcohol (e.g., ethanol), and a hydroxide or carbonate base (e.g., KOH).

Owing at least in part to the sterically bulky bis-alkenyloxy functionality on the 1,4-benzenedicarboxylic core, which without being bound by theory may act to partially obstruct the pores of the MOF structure, the Zr-MOF herein may have a BET surface area of 300 to 600 $m^2/g$, preferably 320 to 580 $m^2/g$, preferably 340 to 560 $m^2/g$, preferably 360 to 540 $m^2/g$, preferably 380 to 520 $m^2/g$, preferably 400 to 500 $m^2/g$, preferably 420 to 480 $m^2/g$, preferably 440 to 470 $m^2/g$, preferably 450 to 460 $m^2/g$, preferably 459 $m^2/g$. Further, the Zr-MOF may have a pore volume of 0.1 to 0.25 $cm^3/g$, preferably 0.11 to 0.23 $cm^3/g$, preferably 0.12 to 0.21 $cm^3/g$, preferably 0.13 to 0.2 $cm^3/g$, preferably 0.14 to 0.18 $cm^3/g$, preferably 0.15 to 0.16 $cm^3/g$, preferably 0.153 $cm^3/g$. Both the surface area and pore volume values of the Zr-MOF of the present disclosure are thus significantly different from those reported for UiO-66 (BET surface area of about 1100 to 1250 $m^2/g$ and a pore volume of about 0.44 $cm^3/g$) as well as functionalized variants such as UiO-66-$NH_2$ (prepared using 2-amino-1,4-benzenedicarboxylic acid ($NH_2$-BDC) linkers, BET surface area of about 1050 to 1150 $m^2/g$ and a pore volume of about 0.517 $cm^3/g$)(see also Table 2).

In some embodiments, the zirconium metal-organic framework of the present disclosure has a particle size of 0.1 to 1 μm, preferably 0.12 to 0.9 μm, preferably 0.14 to 0.8 μm, preferably 0.16 to 0.7 μm, preferably 0.18 to 0.6 μm, preferably 0.2 to 0.5 μm, preferably 0.3 to 0.4 μm, and each particle may have clearly visible facets.

One of the advantages of the UiO-66 network is it's remarkable thermal stability. While use of the linker of formula (I) has been found to reduce the thermal stability of the Zr-MOF compared to parent UiO-66, the Zr-MOF of the present disclosure is still quite high, and is thermally stable in oxygen up to 280° C.

The Zr-MOF of the present disclosure is also exceptionally chemically stable, and retains its crystal structure and connectivity (topology) in a variety of solvents including, but not limited to, nonpolar solvents (e.g., hexane, chloroform), polar aprotic solvents (e.g., dimethylformamide, ethyl acetate, dichloromethane), and polar protic solvents (e.g., methanol, water). One of the most significant obstacles for industrial $CO_2$ capture and treatment is loss of adsorption properties of an adsorbent due to the presence of water contamination that can be competitively adsorbed into an adsorbing materials active sites. For example, post-combustion process streams contain a significant percentage of water, for example 5 to 7 vol. %. To practically capture $CO_2$ under these conditions, the adsorbent material should remain effective in the presence of water and have a higher selectivity for $CO_2$ than $N_2$ or $H_2O$. The Zr-MOF of the present disclosure is chemically stable in water and may be used in $CO_2$ capture applications of gas mixtures that contain water vapor.

The zirconium metal-organic framework of the present disclosure has an effective adsorption capacity for $CO_2$, which can be determined by thermodynamic, low pressure, single component gas adsorption isotherms. For example, the Zr-MOF may have a $CO_2$ uptake capacity of 75 to 90 cm³/g, preferably 77 to 88 cm³/g, preferably 79 to 86 cm³/g, preferably 81 to 84 cm³/g, preferably 83 to 83.5 cm³/g at 273 K and 760 Torr. The Zr-MOF may have a $CO_2$ uptake capacity of 40 to 60 cm³/g, preferably 42 to 58 cm³/g, preferably 44 to 56 cm³/g, preferably 46 to 54 cm³/g, preferably 48 to 52 cm³/g, preferably 50 to 51 cm³/g at 298 K and 760 Torr. For comparison, at these same temperature and pressures (298 K and 760 Torr), the Zr-MOF may have a $CH_4$ uptake capacity 9.8 cm³/g and a $N_2$ uptake capacity of 2.4 cm³/g. The Zr-MOF may have a $CO_2$ uptake capacity of 20 to 35 cm³/g, preferably 22 to 33 cm³/g, preferably 24 to 31 cm³/g, preferably 26 to 29 cm³/g, preferably 27 to 28 cm³/g at 313 K and 760 Torr.

The zirconium metal-organic framework of the present disclosure is selective towards adsorption of $CO_2$ and is thereof useful for various $CO_2$ capture applications. For example, the zirconium metal-organic framework may have an ideal selectivity of $CO_2/N_2$ of 55 to 75, preferably 57 to 73, preferably 59 to 70, preferably 61 to 67, preferably 63 to 65, as well as an ideal selectivity of $CO_2/CH_4$ of 10 to 22, preferably 12 to 20, preferably 14 to 18, preferably 16 to 17, as calculated using single component isotherms by Henry's law.

Another measure of a material's physisorption affinity towards $CO_2$ is coverage-dependent enthalpy of adsorption ($Q_{st}$) or isosteric heat of adsorption. In some embodiments, the Zr-MOF disclosed herein has a coverage-dependent enthalpy of adsorption ($Q_{st}$) of $CO_2$ of 25 to 29 kJ/mol, preferably 26 to 28.5 kJ/mol, preferably 27 to 28 kJ/mol, preferably 27.5 to 27.8 kJ/mol.

Without being bound by theory, it is believed that the presence of the alkene functionality on the linker of formula (I) introduces π bonding in the structural framework that leads to an increase in the polarity of the pores, which may help to increase the uptake of $CO_2$ molecules compared to other gases such as nitrogen and natural gas.

A Method of Making the Zirconium Metal-Organic Framework (Zr-MOF)

The present disclosure also provides methods for making the zirconium metal-organic frameworks. Preferably, pre-synthetic modification methods are utilized to construct the MOF structure using prefunctionalized linkers (e.g., of formula (I)). While any synthetic techniques may be utilized, in preferred embodiments, the Zr-MOFs herein are prepared using solvothermal synthesis techniques to form a coordination product between zirconium ion clusters and the linker of formula (I).

The methods herein may first involve mixing together a zirconium(IV) salt and the linker of formula (I) in a polar aprotic solvent to form a complexation mixture. A concentration of the zirconium(IV) salt in the complexation mixture may range from 0.01 to 0.03 M, preferably 0.012 to 0.028 M, preferably 0.014 to 0.026 M, preferably 0.016 to 0.024 M, preferably 0.018 M to 0.022 M, preferably 0.0218 M. The zirconium(IV) salt may include, but is not limited to, zirconium(IV) chloride, zirconium(IV) bromide, zirconium (IV) acetylacetonate, zirconium(IV) fluoride, zirconium(IV) hydroxide, zirconium(IV) acetate hydroxide, and zirconium (IV) trifluoroacetylacetonate, preferably zirconium(IV) chloride.

In some embodiments, a concentration of the linker of formula (I) in the complexation mixture is 0.005 to 0.025 M, preferably, 0.007 to 0.023 M, preferably 0.009 to 0.021 M, preferably 0.01 to 0.020 M, preferably 0.013 to 0.018 M, preferably 0.014 to 0.016 M, preferably 0.015 M. In some embodiments, a molar ratio of the linker of formula (I) to the zirconium(IV) salt in the complexation mixture is from 0.5:1 to 2:1, preferably 0.55:1 to 1.5:1, preferably 0.6:1 to 1:1, preferably 0.65:1 to 0.7:1, preferably 0.68:1.

The polar aprotic solvent may include, but is not limited to, dimethylformamide (DMF), N-methyl-2-pyrrolidone, dimethyl sulfoxide, acetone, acetonitrile, dimethylacetamide, and 1,3-dimethyl-2-imidazolidinone, preferably dimethylformamide.

The zirconium(IV) salt, the linker of formula (I), and the polar aprotic solvent may be mixed by any suitable technique for any period of time until complete dissolution is achieved. For example, the ingredients may be stirred, shaken, ultrasonicated, or otherwise agitated for 1 to 60 minutes, preferably 5 to 50 minutes, preferably 10 to 45 minutes, preferably 20 to 40 minutes, preferably 30 to 35 minutes.

A modulator may be optionally added to the complexation mixture. Any amount of modulator may be used which still allows the linker of formula (I) to form the desired coordinated network topology (e.g., isoreticular with respect to UiO-66). Typically, when employing a modulator, a volume ratio of the polar aprotic solvent to the modulator in the complexation mixture is from 20:1 to 60:1, preferably 25:1 to 55:1, preferably 30:1 to 50:1, preferably 35:1 to 45:1, preferably 40:1. The modulator may include, but is not limited to, acetic acid, formic acid, benzoic acid, trifluoroacetic acid, and hydrochloric acid, preferably acetic acid is employed as the modulator.

Next, the complexation mixture may be heated, for example heated under solvothermal conditions in an acceptable vial, vessel, or autoclave to a temperature of 100 to 150° C., preferably 105 to 145° C., preferably 110 to 140° C., preferably 115 to 135° C., preferably 120 to 130° C., for 12 to 72 hours, preferably 16 to 48 hours, preferably 20 to 36 hours, preferably 24 to 30 hours. Under such coordination conditions, the Zr-MOF of the present disclosure may be formed by self-assembly of the building blocks (i.e., zirconium ion clusters and the linker of formula (I)) and may precipitate from solution due to insolubility in the reaction environment. It is preferred that the Zr-MOF herein is formed by self-assembly, and thus the methods of the present disclosure do not require the use of surfactants, structure-directing agents, complexing agents, or templating agents.

Once formed, the Zr-MOF may be separated from the complexation mixture using any known solid-liquid separation technique (e.g., filtration, decantation, centrifugation, etc.) and optionally washed with a polar aprotic solvent (e.g., DMF). In preferred embodiments, the collected Zr-MOF is washed with DMF, preferably washed with DMF at least 2 times, preferably at least 3 times, with centrifugation at 5,000 to 15,000 rpm, preferably at 10,000 rpm following each washing iteration. After washing with the polar aprotic solvent, the Zr-MOF may optionally be washed with an alcohol (e.g., methanol), for example washed with an alcohol at least 2 times per day, preferably at least 3 times per day, and the washing may be performed for 1 day, preferably for 2 consecutive days, preferably for 3 consecutive days, most preferably washed with methanol 3 times per day for 3 consecutive days.

Lastly, it is preferred to dry the Zr-MOF under vacuum and at elevated temperature, for example, at 70 to 130° C., preferably 80 to 120° C., preferably 90 to 110° C., preferably 100° C., in order to remove any solvent molecules that may remain in the octahedral and/or tetrahedral pores (cages) prior to use, although such a drying/desorption step is optional.

A Method of Capturing $CO_2$

The present disclosure also provides a method of capturing $CO_2$ from a gas mixture with the zirconium metal organic framework disclosed herein. The methods herein can be used for the capture of $CO_2$ from large point sources, such as large fossil fuel or biomass electricity power plants, industries with major $CO_2$ emissions, natural gas processing, synthetic fuel plants, and fossil fuel-based hydrogen production plants. Capture from the open atmosphere is also possible. Therefore, the Zr-MOF may be useful in $CO_2$ removal/capture from various gas mixtures that contain carbon dioxide ($CO_2$) and at least one other gas. The other gas may include, but is not limited to, nitrogen, hydrogen, oxygen, water (vapor), carbon monoxide, hydrocarbons having 1-4 carbon atoms (e.g. methane, ethane, ethylene, acetylene, propane, propylene, butane, iso-butane), nitrogen oxides (i.e. nitric oxide, nitrous oxide, nitrogen dioxide), and noble gases (e.g. helium, neon, argon, krypton, xenon), including mixtures thereof. In preferred embodiments, the other gas is one or more of hydrogen, oxygen, nitrogen, methane, and carbon monoxide, more preferably one or more of nitrogen and methane.

The Zr-MOF of the present disclosure may be well-suited for applications where fossil fuels are burnt for electricity. For example, the gas mixture may be a pre-combustion gas mixture, that is, a gas mixture produced from de-carbonizing a fuel source prior to combustion taking place. Pre-combustion processing is typically used in the production of fertilizer, chemical gaseous fuel ($H_2$, $CH_4$), cement processing, and power production facilities (e.g., biomass power plant), and the like. For example, in gasification processes a feedstock (such as coal) is partially oxidized in steam and oxygen/air under high temperature and pressure, for instance in a gasifier, to form synthesis gas. This synthesis gas, or syngas, is a mixture of hydrogen, carbon dioxide ($CO_2$) and smaller amounts of other gaseous components, such as methane. Syngas is an important intermediate for production of hydrogen, ammonia, methanol, and synthetic hydrocarbon fuels, and can be produced from many sources, including natural gas, coal, biomass, or virtually any hydrocarbon feedstock, by reaction with steam (steam reforming), carbon dioxide (dry reforming), or oxygen (partial oxidation). For example, syngas can be subject to the water-gas shift reaction to convert CO and water to $H_2$ and $CO_2$, producing a $H_2$ and $CO_2$-rich gas mixture. The $CO_2$ can then be captured and separated, transported, and ultimately sequestered or processed, and the $H_2$-rich fuel combusted. Syngas is also used as an intermediate in producing synthetic petroleum for use as a fuel or lubricant via the Fischer-Tropsch process and previously the Mobil methanol to gasoline process. In some embodiments, the method is applied to remove/capture $CO_2$ from a pre-combustion gas mixture, for example a pre-combustion gas mixture having a $CO_2$ concentration of 15 to 50 vol. %, preferably 20 to 45 vol. %, preferably 25 to 40 vol. %, preferably 30 to 35 vol. %, based on a total volume of the (pre-combustion) gas mixture.

Alternatively, the gas mixture may be a post-combustion gas mixture, i.e., a gas mixture produced after combustion of a fossil fuel, for example the gas mixture may be an exhaust (flue) gas from a power station or other large point source. In some embodiments, the method is applied to remove/capture $CO_2$ from a post-combustion gas mixture, for example a post-combustion gas mixture having a $CO_2$ concentration of 5 to 15 vol. %, preferably 6 to 14 vol. %, preferably 7 to 13 vol. %, preferably 8 to 12 vol. %, preferably 9 to 11 vol. %, preferably 10 vol. %, based on a total volume of the (post-combustion) gas mixture. Additionally, the post-combustion gas mixture may also include 70 to 75 vol. %, preferably 71 to 74 vol. %, preferably 72 to 73 vol. % of $N_2$ and 5 to 7 vol. %, preferably 5.5 to 6.5 vol. %, preferably 6 vol. % $H_2O$, each based a total volume of the (post-combustion) gas mixture. In preferred embodiments, the $CO_2$-capturing methods herein are performed post-combustion, i.e., the gas mixture is a post-combustion gas mixture, for example, a flue gas.

The $CO_2$ capture/removal methods of the present disclosure may be performed by contacting the gas mixture with the zirconium metal-organic framework disclosed herein to adsorb at least a portion of the $CO_2$ into/onto the zirconium metal-organic framework, thereby forming a loaded zirconium metal-organic framework and a gas stream depleted in $CO_2$ compared to the gas mixture.

Adsorption technologies may be employed herein for $CO_2$ capture, for example, the $CO_2$ may be adsorbed by the Zr-MOF via a physisorption process, meaning the process is primarily physical and preferably no chemical changes occur on the Zr-MOF or to the $CO_2$ molecules. As such, the Zr-MOF may be freestanding or supported on or within a substrate, for example, the Zr-MOF may be housed within a chamber, for example, a column, plug, or filter. Preferably, the Zr-MOF may be supported within a fixed-bed column.

The chamber may be of any shape so long as the Zr-MOF can be securely housed and utilized inside the chamber to accomplish the gas adsorption. The chamber may include an inlet configured to accept a feed stream (gas mixture), a gas stream outlet configured to expel a permeate (a gas stream depleted in $CO_2$), and optionally a retentate outlet configured to expel a retentate (a $CO_2$ rich stream). The chamber can be configured to be pressurized so as to force the gas mixture though the inlet and through a bed of the Zr-MOF (and optionally a support) to enable infusion of $CO_2$ present in the gas mixture into the pore spaces of the Zr-MOF, thereby forming the loaded zirconium metal-organic framework. The chamber may also be connected to a vacuum pump to provide vacuum or a reduced pressure to the gas stream outlet for a similar purpose.

Membrane gas separation technologies may also be employed herein for $CO_2$ capture, for example, the Zr-MOF may be utilized in a mixed matrix membrane by homogeneously interpenetrating the Zr-MOF of the present disclosure within a polymer matrix, along with other optional filler materials. In such cases, the zirconium metal-organic framework may be present in an amount of 0.1 to 50 wt. %, preferably 0.5 to 40 wt. %, preferably 1 to 30 wt. %, preferably 2 to 20 wt. %, preferably 3 to 15 wt. %, preferably 4 to 10 wt. %, preferably about 5 wt. %, relative to a total weight of the membrane.

The membrane may be a thin film membrane (e.g., a thickness of 10 to 2,000 μm), a flat sheet membrane, a spiral membrane, a tubular membrane, or a hollow fiber membrane. The membrane may be in the form of various shapes, for example, flat (e.g., for a disc-shaped membrane), bent, curved (e.g., a cylinder shaped membrane), and rippled. The membrane may have a porous morphology. For example, the membrane may contain unconnected pores each representing an isolated cavity having an unbroken pore wall, with the pores extending through the membrane without intersecting one another (e.g., monolithic membrane). Alternatively, the membrane may contain pores which are part of an interconnected network of pores where the pores in the membrane are randomly oriented and intersect. The membrane may contain micropores (an average diameter of less than 2 nm), mesopores (an average diameter of 2-50 nm), macropores (an average diameter larger than 50 nm), or a mixture thereof. For example, the membrane may be macroporous, having pores with an average diameter in a range of 0.5 to 10 µm, preferably 1 to 8 µm, preferably 1.5 to 6 µm, preferably 2 to 5 µm, preferably 3 to 4 µm.

The polymer matrix preferably has a high glass transition temperature ($T_g$), high melting point, and high crystallinity, i.e., the polymer is preferably a rigid, glassy polymer. In some embodiments, the polymer (of the polymer matrix) has a weight average molecular weight ($M_w$) of $1\times10^4$ to $2\times10^7$ g/mol, preferably $5\times10^4$ to $1.5\times10^7$ g/mol, preferably $1\times10^5$ to $1\times10^7$ g/mol.

Exemplary polymers that may be used to construct the polymer matrix in the disclosed mixed matrix membranes include, but are not limited to:

polyolefins such as polyethylene, polypropylene, polybutene-1, and poly(4-methyl pentene-1), including polyvinyls and fluoropolymer variants thereof, for example polyvinylidene fluoride (PVDF), polytetrafluoroethylene (PTFE), polyvinyl chloride, polyvinyl fluoride, polyvinylidene chloride, polyvinylidene fluoride, polyvinyl alcohol, polyvinyl ester (e.g., polyvinyl acetate and polyvinyl propionate), polyvinyl pyridine, polyvinyl pyrrolidone, polyvinyl ether, polyvinyl ketone, polyvinyl aldehyde (e.g., polyvinyl formal and polyvinyl butyral), polyvinyl amide, polyvinyl amine, polyvinyl urethane, polyvinyl urea, polyvinyl phosphate, and polyvinyl sulfate;

polystyrene (e.g., isotactic polystyrene and syndiotactic polystyrene), including styrene-containing copolymers such as acrylonitrilestyrene copolymers, styrene-butadiene copolymers and styrene-vinylbenzylhalide copolymers;

thermoplastic elastomers (TPE);

silicones such as polydimethylsiloxane (PDMS) and polymethylphenylsilicone (PMPS);

polyacetylenes such as polytrimethylsilylpropyne;

polysulfones including polyethersulfones (PESs) as well as sulfonated PESs, with specific mention being made to poly(1,4-phenylene ether-ether-sulfone), poly(1-hexadecene-sulfone), poly(1-tetradecene-sulfone), poly(oxy-1,4phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), polyphenylsulfone, and ULTRASON S 6010 from BASF;

polysulfonamides such as poly[1-[4-(3-carboxy-hydroxyphenylazo)benzenesulfonamido]-1,2-ethanediyl]);

polyacetals;

polyethers;

polyethylenimines;

polycarbonates;

cellulosic polymers such as cellulose acetate, cellulose triacetate, cellulose acetate-butyrate, cellulose propionate, ethyl cellulose, methyl cellulose, and nitrocellulose;

polyamides including aromatic polyamides and aliphatic polyamides, such as Nylon 6 and polyphthalamide;

polyimides with specific mention being made to KAPTON (poly (4,4'-oxydiphenylene-pyromellitimide) by DuPont, MATRIMID by Huntsman Advanced Materials, P84 by HP Polymers GmbH, poly(3,3',4,4'-benzophenone tetracarboxylic dianhydride-pyromellitic dianhydride-3,3',5,5'-tetramethyl-4,4'-methylene dianiline) (or poly(BTDA-PMDA-TMMDA)), poly(3,3',4,4'-benzophenone tetracarboxylic dianhydride-pyromellitic dianhydride-4,4'-oxydiphthalic dianhydride-3,3',5,5'-tetramethyl-4,4'-methylene dianiline) (or poly (BTDA-PMDA-ODPA-TMMDA)), poly(3,3',4,4'-diphenylsulfone tetracarboxylic dianhydride-3,3',5,5'-tetramethyl-4,4'-methylene dianiline) (or poly(DSDA-TMMDA)), poly(3,3',4,4'-benzophenone tetracarboxylic dianhydride-3,3',5,5'-tetramethyl-4,4'-methylene dianiline) (or poly(BTDA-TMMDA)), poly (3,3',4,4'-diphenylsulfone tetracarboxylic dianhydride-pyromellitic dianhydride-3,3',5,5'-tetramethyl-4,4'-methylene dianiline) (or poly(DSDA-PMDA-TMMDA)), and poly[2,2'-bis-(3,4-dicarboxyphenyl) hexafluoropropane dianhydride-2,2-bis(3-amino-4-hydroxyphenyl)-hexafluoropropane] (or poly(6FDA-APAF)), poly[3,3',4,4'-benzophenonetetracarboxylic dianhydride-2,2-bis(3-amino-4-hydroxyphenyl)-hexafluoropropane] (or poly(BTDA-APAF)), poly(3,3',4,4'-benzophenonetetracarboxylic dianhydride-3,3'-dihydroxy-4,4'-diamino-biphenyl) (or poly(BTDA-HAB)), poly[4,4'-oxydiphthalic anhydride-2,2-bis(3-amino-4-hydroxyphenyl)-hexafluoropropane] (or poly (ODPA-APAF)), poly[3,3',4,4'-diphenylsulfone tetracarboxylic dianhydride-2,2-bis(3-amino-4-hydroxyphenyl)-hexafluoropropane] (or poly(DSDA-APAF)), poly(3,3',4,4'-diphenylsulfone tetracarboxylic dianhydride-3,3'-dihydroxy-4,4'-diamino-biphenyl) (or poly(DSDA-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (or poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (or poly (ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (or poly(BTDA-APAF-HAB)), poly[2,2'-bis-(3,4-dicarboxyphenyl) hexafluoropropane dianhydride-3,3'-dihydroxy-4,4'-diamino-biphenyl] (or poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane) (or poly(BPADA-BTDA-APAF));

polyetherimides such as ULTEM products manufactured by Sabic Innovative Plastics;

polyamide imides;

polyketones;

polyether ketones such as polyether ether ketone, sulfonated polyether ether ketone and the like;

polyarylene oxides such as polyphenylene oxide, polyxylene oxide, sulfonated polyxylene oxide and brominated polyxylene oxide;

polyurethanes;

polyureas;

polyazomethines;

polyesters including polyarylates such as polyethylene terephthalate and polyphenylene terephthalate;

acrylates such as polyalkyl (meth)acrylate, polyacrylate, polyacrylate-polyacrylamide copolymers;

polysulfides;

heterocyclic thermoplastics such as polybenzimidazoles, polyoxadiazoles, polytriazoles, polybenzoxazole, and polybenzimidazole;

polycarbodiimides;

polyphosphazines;

polyhydrazides;

and copolymers thereof, including block copolymers, grafts, and blends thereof.

The mixed matrix membrane may be made by methods known to those of ordinary skill in the art, for example, by casting or melt blending, and the polymer matrix may be made porous by known techniques including, but not limited to, irradiation, stretching of a melt-processed semi-crystalline polymer substrate, vapor-induced phase separation, and temperature-induced phase separation, just to name a few.

When the zirconium metal-organic framework of the present disclosure is utilized in mixed matrix membrane separation technologies, the membrane may be housed in chamber such that the membrane divides the chamber into a feed side and a permeate side. The gas mixture may then be fed into the feed side of the chamber so that at least a portion of the $CO_2$ present in the gas mixture permeates the membrane and is adsorbed by the Zr-MOF, thereby forming the loaded Zr-MOF. This may be accomplished for example by supplying the gas mixture at above atmospheric pressure or otherwise forcing at least a portion of the gas mixture through the membrane by pressurizing the feed side, or applying a vacuum to the permeate side of the chamber. A gas stream depleted in $CO_2$ compared to the gas mixture may then be collected from the permeate side, and the chamber may be optionally configured to include a retentate outlet to expel a retentate (a $CO_2$ rich stream) after desorbing $CO_2$ molecules from the loaded Zr-MOF.

Regardless of whether an adsorptive technique (e.g., fixed-bed of the Zr-MOF) or a membrane gas separation technology is utilized, the gas mixture is contacted with the Zr-MOF disclosed herein. The gas mixture may be contacted with the Zr-MOF in a single chamber, or the gas mixture may be passed through a series of chambers housing the Zr-MOF to gradually/sequentially remove/capture $CO_2$ from the gas mixture. Similarly, the Zr-MOF may be used in addition to other known adsorption materials to provide a gas stream depleted in $CO_2$ and a loaded zirconium metal-organic framework.

In some embodiments, prior to contacting the gas mixture with the Zr-MOF, the Zr-MOF is activated through a degassing procedure performed in a sub-atmospheric pressure of 0.05 to 0.8 atm, preferably 0.1 to 0.5 atm, preferably 0.2 to 0.4 atm to remove any gas or solvent molecules that may reside in the pore spaces of the Zr-MOF. The Zr-MOF may be degassed at a temperature of 0 to 200° C., preferably 10 to 150° C., preferably 25 to 100° C., or about 80° C. for 1 to 48 hours, preferably 2 to 36 hours, preferably 8 to 24 hours, preferably 12 to 18 hours.

A force may be provided to deliver the gas mixture into contact with the Zr-MOF. The gas mixture may be introduced at flow rate of 0.001 to 1,000 L/min, preferably 0.005 to 500 L/min, preferably 0.01 to 100 L/min, preferably 0.05 to 10 L/min, preferably 0.1 to 5 L/min, preferably 0.5 to 2 L/min. In some embodiments, the gas mixture is pressurized (e.g., be applying pressure to a feed side of a chamber) at a pressure of greater than 760 and up to 4,000 Torr, preferably 800 to 3,500 Torr, preferably 850 to 3,000 Torr, preferably 900 to 2,500 Torr, preferably 1,000 to 2,000 Torr to force at least a portion of the gas mixture to contact the Zr-MOF. In some embodiments, the gas mixture is contacted with the Zr-MOF under vacuum, for example by applying a reduced pressure of less than 760 Torr, preferably 10 to 750 Torr, preferably 20 to 700 Torr, preferably 30 to 600 Torr to the permeate side of a chamber such that at least a portion of the gas mixture is brought into contact with the Zr-MOF. Alternatively, the gas mixture may stay stagnant over the Zr-MOF (i.e. as an atmosphere to the Zr-MOF) for a suitable amount of time to enable adsorption of $CO_2$.

The gas mixture may be contacted with the zirconium metal-organic framework at any temperature that enables desired levels of $CO_2$ capture, for example, the gas mixture may have a temperature of −5 to 50° C., preferably 0 to 45° C., preferably 5 to 40° C., preferably 10 to 35° C., preferably 20 to 30° C., preferably 25 to 28° C.

A gas stream depleted in $CO_2$ may be obtained after at least a portion of $CO_2$ is adsorbed onto the Zr-MOF. A composition of the gas stream depleted in $CO_2$ may vary depending on the composition of the gas mixture. In some embodiments, the gas stream depleted in $CO_2$ contains at least 25% less $CO_2$, preferably at least 30% less $CO_2$, preferably at least 40% less $CO_2$, preferably at least 50% less $CO_2$, preferably at least 60% less $CO_2$, preferably at least 70% less $CO_2$, preferably at least 80% less $CO_2$, preferably at least 90% less $CO_2$, preferably at least 95% less $CO_2$, by volume compared to a volume of $CO_2$ present in the gas mixture. For example, when the methods herein are employed in pre-combustion processes, the gas stream depleted in $CO_2$ may contain less than 35 vol % $CO_2$, preferably less than 25 vol % $CO_2$, preferably less than 20 vol % $CO_2$, preferably less than 15 vol % $CO_2$, preferably less than 10 vol % $CO_2$, preferably less than 5 vol % $CO_2$, preferably less than 1 vol % $CO_2$, preferably less than 0.5 vol % $CO_2$, preferably less than 0.1 vol % $CO_2$, based on a total volume of gas stream depleted in $CO_2$. When the methods herein are employed in post-combustion processes, the gas stream depleted in $CO_2$ may contain less than 10 vol % $CO_2$, preferably less than 8 vol % $CO_2$, preferably less than 6 vol % $CO_2$, preferably less than 4 vol % $CO_2$, preferably less than 2 vol % $CO_2$, preferably less than 1 vol % $CO_2$, preferably less than 0.5 vol % $CO_2$, preferably less than 0.1 vol % $CO_2$, preferably less than 0.05 vol % $CO_2$, preferably less than 0.01 vol % $CO_2$, based on a total volume of gas stream depleted in $CO_2$.

In some embodiments, the method of the present disclosure further involves desorbing the $CO_2$ from the loaded Zr-MOF, and reusing the Zr-MOF. The carbon dioxide may be stripped off the Zr-MOF using temperature swing adsorption (TSA) or pressure swing adsorption (PSA) techniques so the Zr-MOF can be reused. For instance, desorbing the $CO_2$ may involve heating the loaded Zr-MOF at a temperature of 50 to 200° C., preferably 60 to 180° C., preferably 70 to 160° C., preferably 80 to 140° C., preferably 90 to 120° C., preferably 100 to 110° C., subjecting the loaded Zr-MOF to a reduced pressure of less than 750 Torr, preferably less than 700 Torr, preferably less than 600 Torr, preferably less than 500 Torr, preferably less than 400 Torr, preferably less than 300 Torr, preferably less than 200 Torr, preferably less than 100 Torr, preferably less than 75 Torr, preferably less than 50 Torr, preferably less than 25 Torr, or a combination of heat and reduced pressure.

The loaded Zr-MOF may be regenerated (i.e. desorbed) and reused without a significant loss in $CO_2$ uptake capacity. For instance, the Zr-MOF may be used to capture $CO_2$, desorbed, and reused for up to 25 cycles, preferably up to 20 cycles, preferably up to 15 cycles, preferably up to 10 cycles, preferably up to 5 cycles.

Desorbing the $CO_2$ from the loaded Zr-MOF generates a gas stream enriched in $CO_2$. Such a gas stream may be optionally subjected to further processing steps such as an additional purification step (e.g. column chromatography, further membrane separation steps, etc.), and any captured and collected $CO_2$ may optionally be subject to numerous processing steps, for example, used for the production of urea, methanol, metal carbonates and bicarbonates, aromatic and aliphatic polycarbonates, and sodium salicylate, as well as used in biotransformations to form fuels such as isobutyraldehyde and isobutanol, as is known to those of ordinary skill in the art.

In addition to pre-combustion and/or post-combustion $CO_2$ capture applications, it is contemplated that the Zr-MOFs disclosed herein may be used in air purifiers, chemical filters, oil and gas refineries, fermenters, bioreactors, or in any other process where the capture/removal of $CO_2$ is desired.

The examples below are intended to further illustrate protocols for preparing the Zr-MOF and for using the Zr-MOF in $CO_2$ capture applications, and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Synthesis of Bisallyloxy-UiO-66

Synthesis of 2,5-Bis(allyloxy)terephthalic acid ($H_2L$): A solution of 2,5-dihydroxyterephthalic acid (400 mg) in methanol (10 mL) and 2 drops of HCl was refluxed for 10 h. The solvent was removed under vacuum and the residue was diluted with water and extracted with $CH_2Cl_2$. The organic layer was dried over anhydrous $Na_2SO_4$ and concentrated to give 2,5-dihydroxy-1,4-dimethyl terephthalate in 87% yield. A mixture of 2,5-dihydroxy-1,4-dimethyl terephthalate (450 mg), allyl bromide (230 mg), potassium carbonate (400 mg) in acetonitrile (10 mL) was refluxed for 12 h. The solvent was removed under vacuum and the residue was diluted with water and extracted with ethyl acetate. The organic layer was dried over anhydrous $Na_2SO_4$ and concentrated to give 2,5-allyloxy-1,4-dimethyl terephthalate in 75% yield. Compound 2,5-allyloxy-1,4-dimethyl terephthalate (400 mg) was refluxed with an ethanolic solution of KOH for 12 h. The solvent was removed under vacuum and the residue was diluted with water and the pH was adjusted to 2.0 by addition of HCl. The white solid precipitated was filtered with a Buchner funnel, washed with water, and recrystallized from ethanol to give linker $H_2L$ in 85% yield. $^1H$ NMR (DMSO-$d_6$, 400 MHz): δ=4.57 (d, J=4.5 Hz, 4H), 5.21 (d, J=10.5 Hz, 2H), 5.41 (d, J=16.0 Hz, 2H), 6.02-5.95 (m, 2H), 7.28 (s, 2H), and 12.97 ppm (s, 2H, COOH); $^{13}C$ NMR (DMSO-$d_6$, 200 MHz) δ=70.6, 115.5, 118.4, 125.4, 133.2, 151.0, and 167.22 ppm; Elemental Analysis: Anal. Calcd for $C_{14}H_{14}O_6$: C, 60.43; H, 5.07; Found: C, 60.59; H, 5.10.

Synthesis of Bisallyloxy-UiO-66: Zirconium tetrachloride (51 mg), and $H_2L$ (42 mg) were dissolved in 10 mL of DMF in a glass vial and heated at 120° C. for 24 h. The reaction mixture was then cooled to room temperature. The white solid was collected and washed with 3×10 mL of DMF for three days and 3×10 mL of MeOH for three days yielding Bisallyloxy-UiO-66 in 45% yield (related to the zirconium salt). IR (KBr, $cm^{-1}$): 3194, 3145, 3001, 2925, 2859, 1571, 1531, 1420, 1369, 1281, 1205, 1104, 1060, 999, 931, 869, 812, 776, 550.

Characterization of Bisallyloxy-UiO-66

Fourier transform infrared (FT-IR) spectroscopy measurements demonstrated the presence of the characteristic stretching vibrational bands of the allyloxy moiety as well as shifted absorption bands for the carboxylate moiety upon coordination (FIG. 1).

Figure 2:
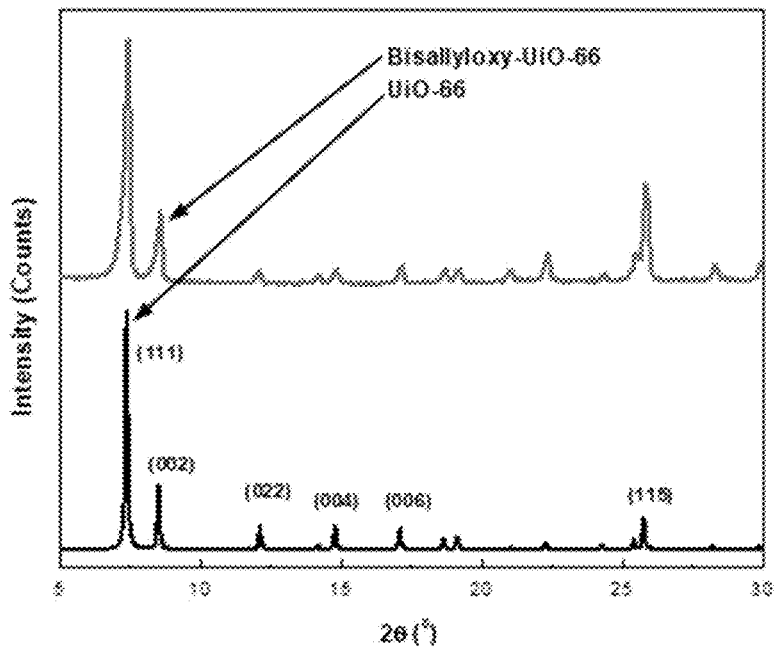
FIG. 2 illustrates the pXRD of UiO-66 and Bisallyloxy-UiO-66.

The powdered XRD pattern of Bisallyloxy-UiO-66, was consistent with that of UiO-66 reported in the literature (FIG. 2). Bisallyloxy-UiO-66 was successfully synthesized with the same high crystallinity and characteristic peaks of UiO-66 at 2θ=7.78°, 8.92° (FIG. 2).

Figure 3:
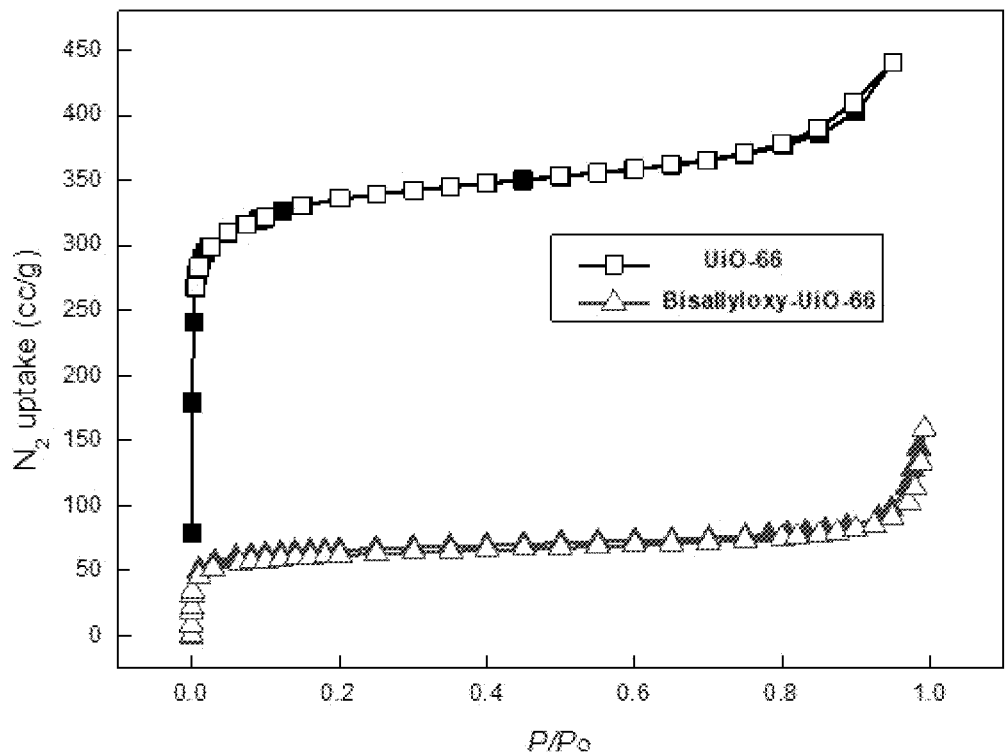
FIG. 3 illustrates the $N_2$ adsorption isotherms of UiO-66 and Bisallyloxy-UiO-66 where the filled and open circles represent the adsorption and desorption branches, respectively.

The $N_2$ adsorption and desorption isotherm curves of Bisallyloxy-UiO-66 were collected at 77 K reveal that they comprised micropores as typically observed in UiO-66 based MOFs. The BET surface area of Bisallyloxy-UiO-66 was found to be 459 $m^2/g$ and the pore volume 0.153 $cm^3/g$. The small BET surface area and pore volume indicate that the interspace of Bisallyloxy-UiO-66 was occupied by the allyloxy group (FIG. 3).

Figure 4:
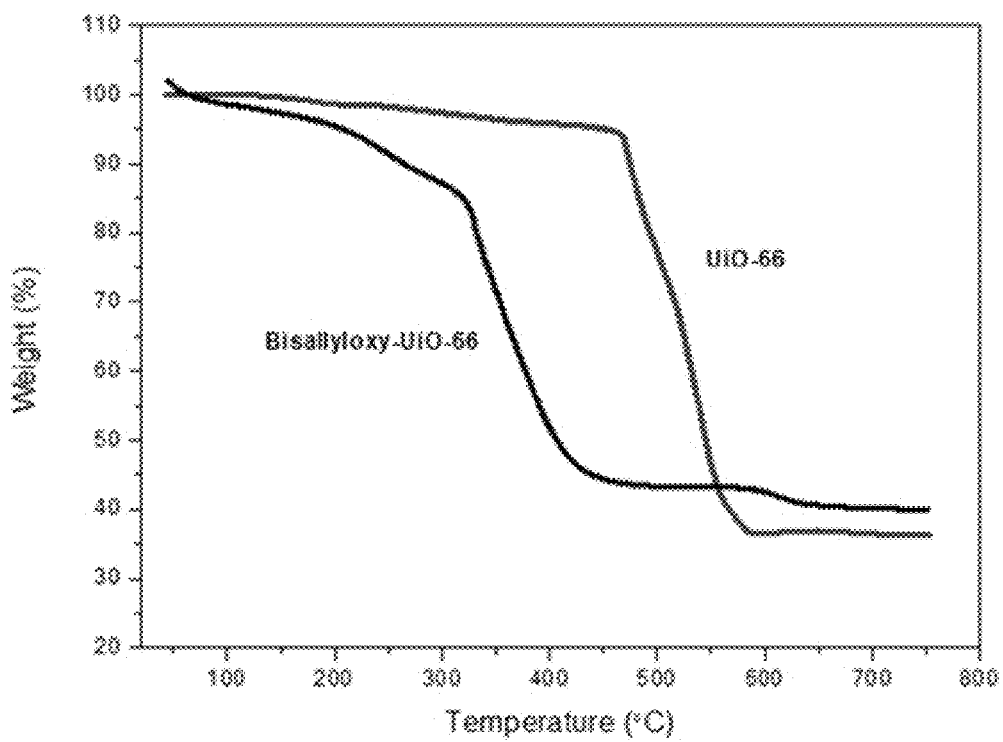
FIG. 4 illustrates the TGA of UiO-66 and Bisallyloxy-UiO-66.
Figure 5:
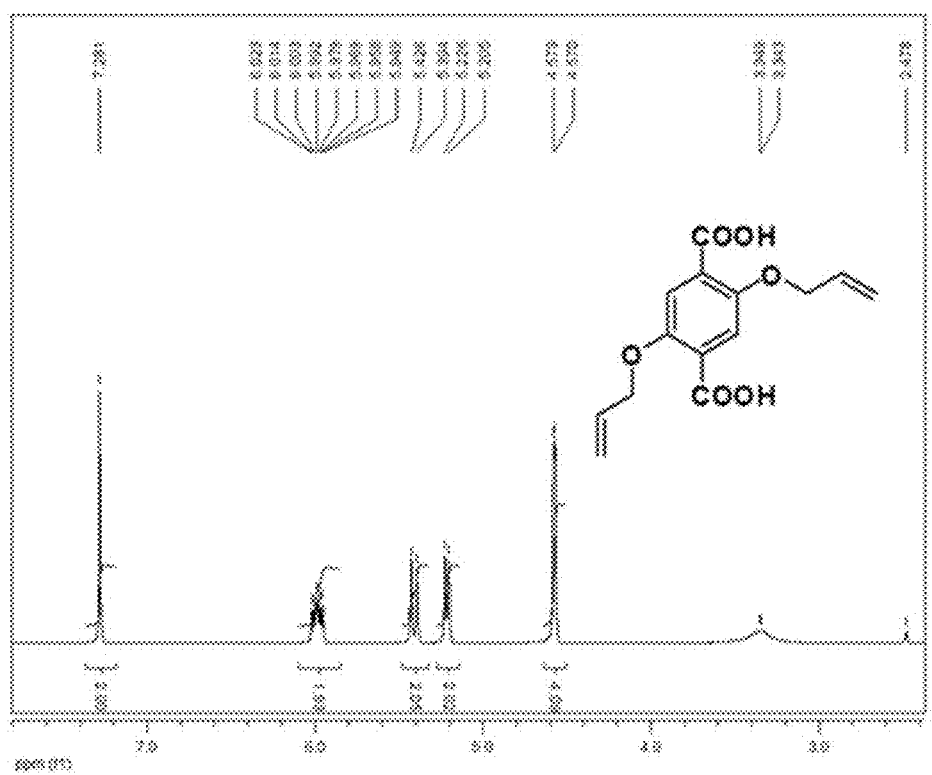
FIG. 5 illustrates the digestion $^1$HNMR of Bisallyloxy-UiO-66.

The thermal stability of Bisallyloxy-UiO-66 was investigated using a thermogravimetric analysis (TGA) as shown in FIG. 4. The TGA curve of the as-synthesized Bisallyloxy-UiO-66 showed sequential significant weight losses occurred during the thermal decomposition from 220° C. up to 400° C. These successive weight losses can be attributed to the dehydroxylation of OH and decomposition of the ligand/linker. The remaining residue at the end of the decomposition was primarily zirconium oxides derived from the "node" of Bisallyloxy-UiO-66 (FIG. 4). The less metal oxide residue is due to the bulky nature of bulky bisallyloxy linker compare to benzenedicarboxylic acid in UiO-66. The digestion NMR shows all the peaks that matches with the peaks of the linker $H_2L$ (FIG. 5).

Figure 6:
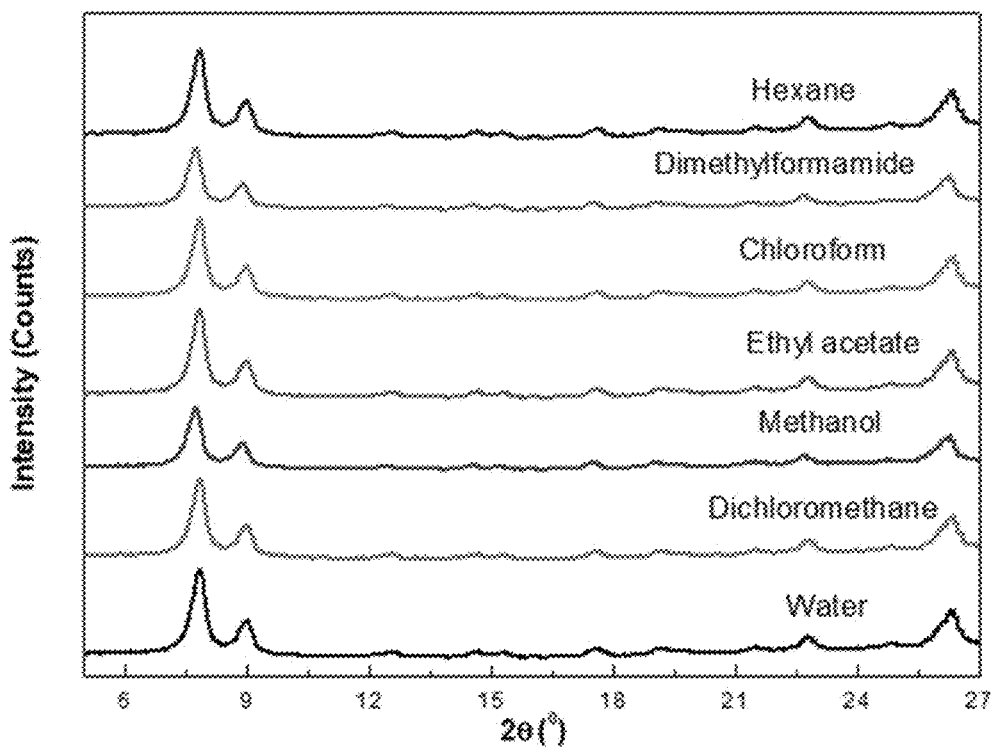
FIG. 6 illustrates the PXRD of Bisallyloxy-UiO-66 in different organic solvents and water.

Stability of Bisallyloxy-UiO-66 in Different Solvents:

500 mg of dried Bisallyloxy-UiO-66 was suspended in different organic solvents and water for 24 hours. After that the material was centrifuged and then washed with methanol three times, dried in oven at 110° C. and then the powdered XRD was checked. It was found that the crystallinity of the Bisallyloxy-UiO-66 remained unaltered in different solvents and water (FIG. 6).

Carbon Capture and Separation Studies

Figure 7A:
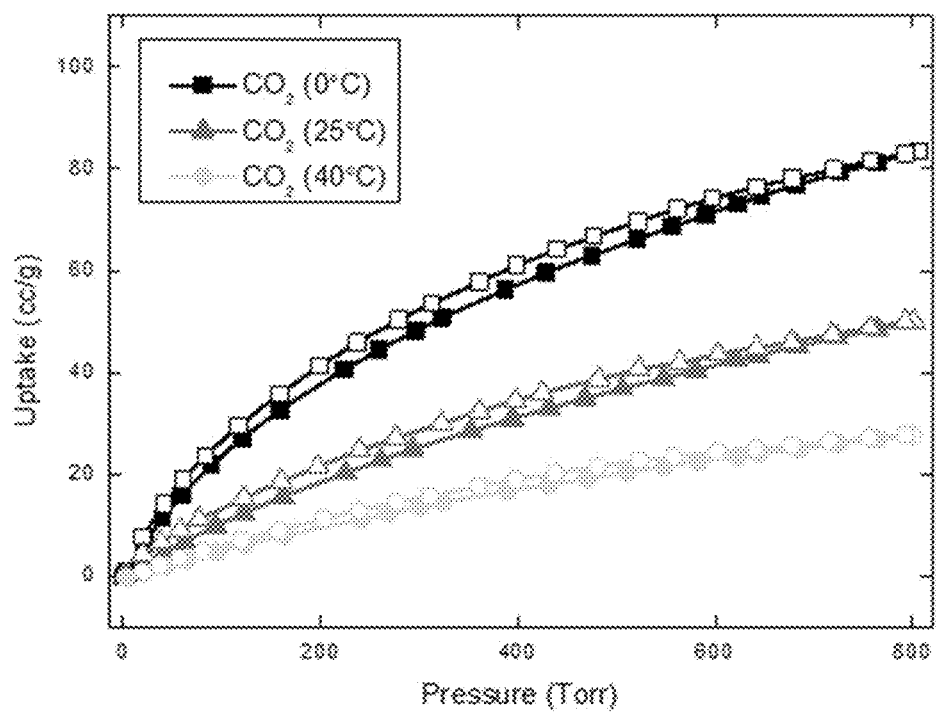
FIG. 7A illustrates the $CO_2$ isotherms for Bisallyloxy-UiO-66 at 273 (squares), 298 K (triangles), and 313 K (circles), where the filled and open symbols represent adsorption and desorption branches, respectively.
Figure 7B:
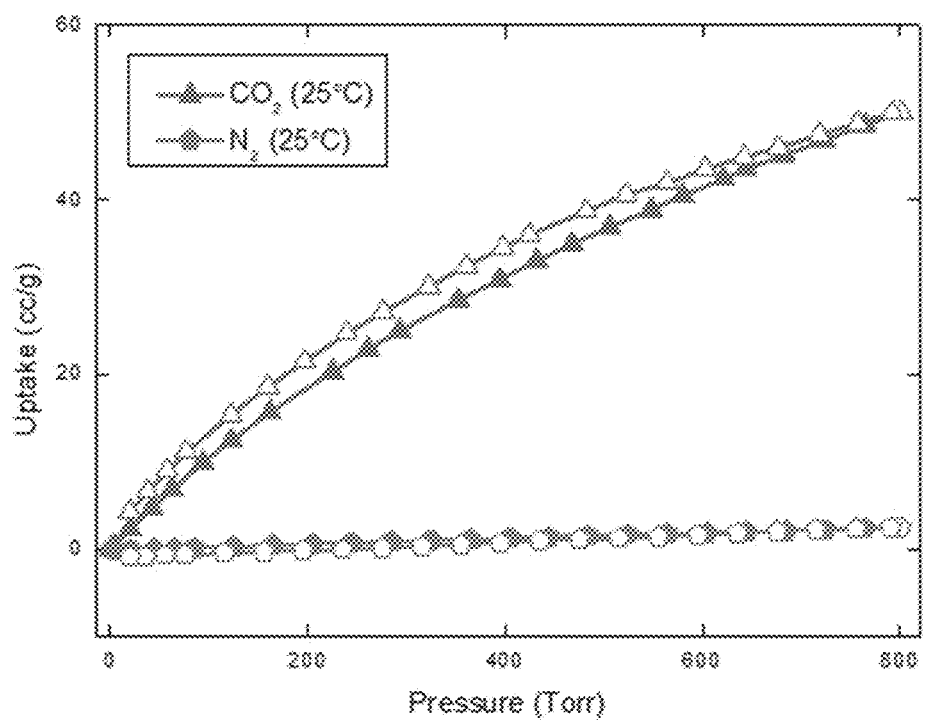
FIG. 7B illustrates the $CO_2$ (triangles) and $N_2$ (pentagons) isotherms for Bisallyloxy-UiO-66 at 298 K, where the filled and open symbols represent adsorption and desorption branches, respectively.
Figure 7C:
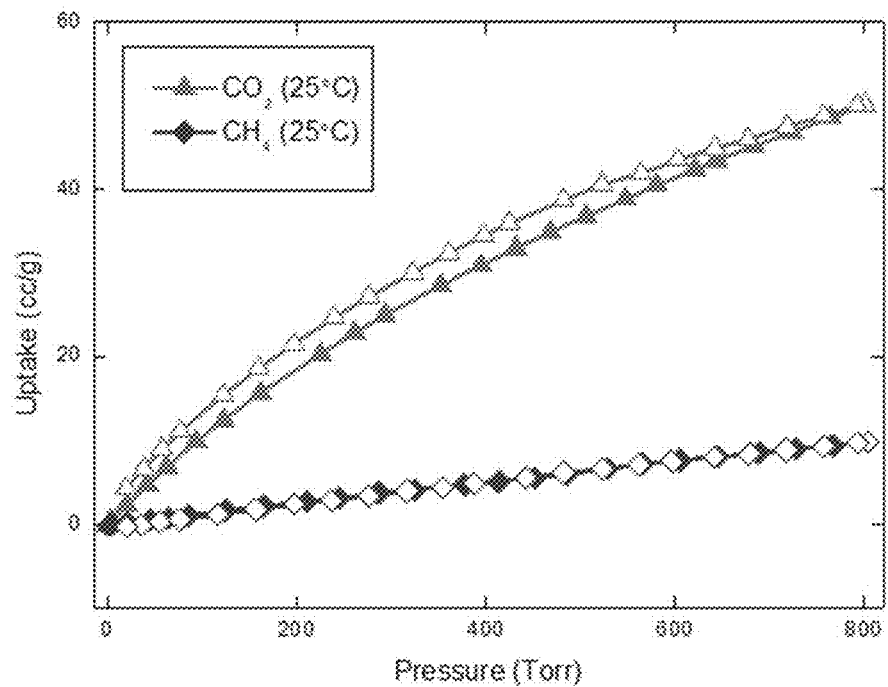
FIG. 7C illustrates the $CO_2$ (triangles) and $CH_4$ (diamonds) isotherms for Bisallyloxy-UiO-66 at 298 K, where the filled and open symbols represent adsorption and desorption branches, respectively.
Figure 8A:
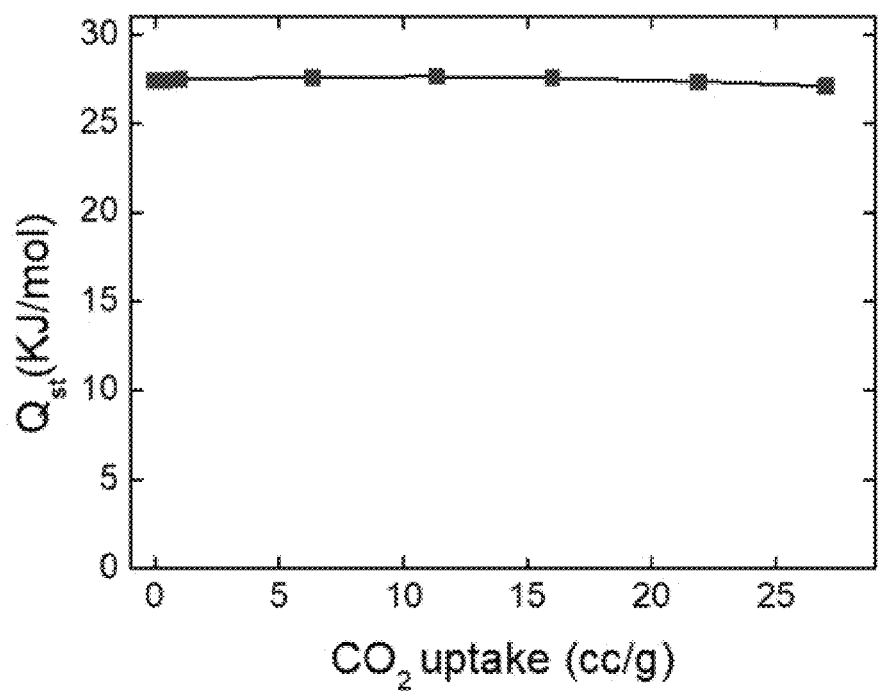
FIGS. 8A-8B illustrate the coverage-dependent enthalpy of adsorption ($Q_{st}$) for $CO_2$ collected at 273 and 298 K on Bisallyloxy-UiO-66.
Figure 8B:
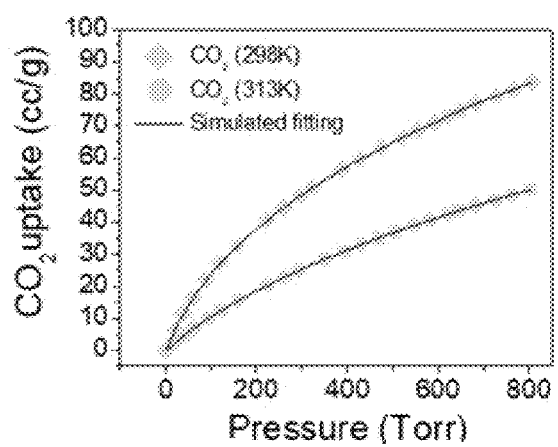

On the basis of the Bisallyloxy-UiO-66 linker functionalization, high porosity and thermal stability, the thermodynamic gas adsorption properties of the prepared Bisallyloxy-UiO-66 material was investigated. Accordingly, low-pressure, single-component gas adsorption isotherms for $CO_2$ capture were performed with newly synthesized Bisallyloxy-UiO-66 at 273, 298 and 313 K up to 760 Torr as shown in FIG. 7A and summarized in Table 1. Interestingly, the Bisallyloxy-UiO-66 revealed the highest $CO_2$ uptake capacities of 83.5 $cm^3$ $g^{-1}$ at 273 K, 50.5 $cm^3$ $g^{-1}$ at 298 K, and 27.6 $cm^3$ $g^{-1}$ at 313 K at 760 Torr. The nitrogen ($N_2$) and natural gas ($CH_4$) uptake capacities under the same experimental conditions (298 K and 760 Torr) were also examined (FIGS. 7B-7C). As depicted in FIGS. 7B-7C Bisallyloxy-UiO-66 displays a much higher $CO_2$ uptake at 298 K when compared to the $N_2$ and $CH_4$ uptake. The selectivity of $CO_2/N_2$ and $CO_2/CH_4$ were calculated using single component isotherms by Henry's law, where it was found that the selectivities of $CO_2/N_2$ and $CO_2/CH_4$ were 63 and 16 respectively. The highest selectivity of $CO_2/N_2$ is compared with the other UiO-66 functionalized materials and summarized in Table 2.

TABLE 1

Comparison of $CO_2$ capture of Bisallyloxy-UiO-66

| MOF | Capacity (mmol/g) | Temperature (K) | Pressure (bar) | Ref. |
|---|---|---|---|---|
| UiO-66 | 1.8 | 298 | 1 | i |
| UiO-66-$NH_2$ | 3.0 | 298 | 1 | i |
| UiO-66-$NO_2$ | 2.7 | 298 | 1 | i |
| UiO-66-1,4-Naphyl | 1.4 | 298 | 1 | i |
| UiO-66-2,5-$(OMe)_2$ | 2.5 | 298 | 1 | i |
| UiO-$NH_2$ | 2.7 | 298 | 1 | ii |
| PEI96-UiO | 3.2 | 298 | 1 | ii |
| UiO-66-CN | 1.37 | 298 | 1 | iii |
| Azo-UiO-66 | 2.2 | 298 | 1 | iv |
| UiO-66(Hf) | 1.50 | 298 | 1 | iv |
| UiO-66(Hf)—$NH_2$ | 2.80 | 298 | 1 | iv |
| UiO-66(Hf)—$(OH)_2$ | 4.06 | 298 | 1 | iv |
| UiO-66(Hf)—$(COOH)_2$ | 1.20 | 298 | 1 | iv |
| UiO-66(Hf)—$(F)_4$ | 0.82 | 298 | 1 | iv |
| UiO-66 | 1.5 | 298 | 1 | v |
| UiO-66-$NH_2$ | 3.02 | 298 | 1 | v |
| UiO-66-Boric acid | 2.6 | 298 | 1 | vi |
| Bisallyloxy-UiO-66 | 2.23 | 298 | 1 | This work |

Reference: (i) Cmarik, G.E., Kim, M., Cohen, S.M. & Walton, K.S. Tuning the Adsorption Properties of UiO-66 via Ligand Functionalization. *Langmuir* 28, 15606-15613 (2012); (ii) Zhu, J., Wu, L., Bu, Z., Jie, S. & Li, B.-G. Polyethyleneimine-Modified UiO-66-NH2(Zr) Metal-Organic Frameworks: Preparation and Enhanced CO2 Selective Adsorption. *ACS Omega* 4, 3188-3197, 2019; (iii) Yu, G. et al. Constructing Connected Paths between UiO-66 and PIM-1 to Improve Membrane $CO_2$ Separation with Crystal-Like Gas Selectivity. *Advanced Materials* 0, 1806853; (iv) Hu, Z., Nalaparaju, A., Peng, Y., Jiang, J. & Zhao, D. Modulated Hydrothermal Synthesis of UiO-66(Hf)-Type Metal-Organic Frameworks for Optimal Carbon Dioxide Separation. *Inorganic Chemistry* 55, 1134-1141 (2016); (v) Huang, Q., Ding, J., Huang, X., Wei, X. & Wang, W. Experimental and Computational Investigation of CO2 Capture on Mix-ligand Metal-organic Framework UiO-66. *Energy Procedia* 105, 4395-4401 (2017); and (vi) Erkartal, M. & Sen, U. Boronic Acid Moiety as Functional Defect in UiO-66 and Its Effect on Hydrogen Uptake Capacity and Selective CO2 Adsorption: A Comparative Study. *ACS Applied Materials & Interfaces* 10, 787-795 (2018), each incorporated herein by reference in their entirety.

TABLE 2

Bisallyloxy-UiO-66 comparison of $CO_2/N_2$ and $CO_2/CH_4$ selectivities

| Reported MOF name | BET surface area ($m^2\,g^{-1}$) | $CO_2/N_2$ selectivity | $CO_2/CH_4$ selectivity | Adsorption temperature (K.) | Pressure (bar) | Ref. |
|---|---|---|---|---|---|---|
| UiO-$NH_2$ | 987 | 25 | | 298 | 1 | i |
| UiO-66 | 1105 | 37 | 10 | 298 | 1 | ii |
| UiO-66-$NH_2$ | 1123 | 66 | 17 | 298 | 1 | ii |
| UiO-66-$NO_2$ | 792 | 51 | 12 | 298 | 1 | ii |
| UiO-66-1,4-Naphyl | 757 | 30 | 6.5 | 298 | 1 | ii |
| UiO-66-2,5-$(OMe)_2$ | 868 | 62 | 18 | 298 | 1 | ii |
| PEI96-UiO | 7 | 48 | | 298 | 1 | i |
| UiO-66(Hf) | 940 | 20 | 12 | 298 | 1 | iii |
| UiO-66(Hf)-$NH_2$ | 1067 | 32 | 15 | 298 | 1 | iii |
| UiO-66(Hf)-$(OH)_2$ | 922 | 93 | 30 | 298 | 1 | iii |
| UiO-66(Hf)-$(COOH)_2$ | 378 | 27 | 13 | 298 | 1 | iii |
| UiO-66(Hf)-$(F)_4$ | 329 | 24 | 16 | 298 | 1 | iii |
| UiO-66 | 1250 | 26 | N/A | 298 | 1 | iv |
| UiO-66-$NH_2$ | 1084 | 32 | N/A | 298 | 1 | iv |
| $NH_2$-UiO-66 | 1258 | 31 | N/A | 298 | 1 | v |
| GMA-UiO-66 | 965 | 45 | N/A | 298 | 1 | v |
| Bisallyloxy-UiO-66 | 459 | 63 | 16 | 298 | 1 | This work |

Reference: (i) Zhu, J., Wu, L., Bu, Z., Jie, S. & Li, B.-G. Polyethyleneimine-Modified UiO-66-NH2(Zr) Metal-Organic Frameworks: Preparation and Enhanced CO2 Selective Adsorption. *ACS Omega* 4, 3188-3197 (2019);
(ii) Cmarik, G. E., Kim, M., Cohen, S. M. & Walton, K. S. Tuning the Adsorption Properties of UiO-66 via Ligand Functionalization. *Langmuir* 28, 15606-15613 (2012);
(iii) Hu, Z., Nalaparaju, A., Peng, Y., Jiang, J. & Zhao, D. Modulated Hydrothermal Synthesis of UiO-66(Hf)-Type Metal-Organic Frameworks for Optimal Carbon Dioxide Separation. *Inorganic Chemistry* 55, 1134-1141 (2016);
(iv) Huang, Q., Ding, J., Huang, X., Wei, X. & Wang, W. Experimental and Computational Investigation of CO2 Capture on Mix-ligand Metal-organic Framework UiO-66. *Energy Procedia* 105, 4395-4401 (2017); and
(v) Molavi, H., Eskandari, A., Shojaei, A. & Mousavi, S. A. Enhancing CO2/N2 adsorption selectivity via post-synthetic modification of NH2-UiO-66(Zr). *Microporous and Mesoporous Materials* 257, 193-201 (2018), each incorporated herein by reference in their entirety.

Due to the encouraging thermodynamic gas adsorption measurement results, a deeper understanding of Bisallyloxy-UiO-66 chemisorption or physisorption relationship with $CO_2$ was investigated. Accordingly, the coverage-dependent enthalpy of adsorption ($Q_{st}$) for $CO_2$ was estimated by fitting the isotherms collected at 273 and 298 K with a virial-type expansion equation. The resulting initial $Q_{st}$ value for Bisallyloxy-UiO-66 was calculated to be 27.60 kJ $mol^{-1}$ which quantifiably demonstrates the material's physisorption affinity to $CO_2$. It is noted that the $Q_{st}$ remained relatively constant, thus, reflecting the homogeneous binding strengths over multiple sites at low coverage. The $Q_{st}$ value is moderately close for physisorption-driven materials as compared to the related materials in the literature. A comparison of the Qst values are tabulated in Table 3. This observation is indicative of stronger alkene $CO_2$ interactions (i.e. higher affinity) than is found for $N_2$ and $CH_4$ which lends credence to the potential of this material to serve as an adsorbent for selective $CO_2$ capture from flue gas.

TABLE 3

Bisallyloxy-UiO-66 coverage-dependent enthalpy of adsorption comparison ($CO_2$)

| Reported MOF name | $Q_{st}$ of $CO_2$ (kJ $mol^{-1}$) | Ref. |
|---|---|---|
| UiO-66(Hf) | 22.8 | i |
| UiO-66(Hf)—$NH_2$ | 25.6 | i |
| UiO-66(Hf)—$(OH)_2$ | 28.4 | i |
| UiO-66(Hf)—$(COOH)_2$ | 28.2 | i |
| UiO-66(Hf)—$(F)_4$ | 23.4 | i |

TABLE 3-continued

Bisallyloxy-UiO-66 coverage-dependent enthalpy of adsorption comparison ($CO_2$)

| Reported MOF name | $Q_{st}$ of $CO_2$ (kJ mol$^{-1}$) | Ref. |
|---|---|---|
| UiO-66-(CH$_3$)$_2$ | 38 | ii |
| Bisallyloxy-UiO-66 | 27.60 | This work |

Reference: (i) Hu, Z., Nalaparaju, A., Peng, Y., Jiang, J. & Zhao, D. Modulated Hydrothermal Synthesis of UiO-66(Hf)-Type Metal-Organic Frameworks for Optimal Carbon Dioxide Separation. *Inorganic Chemistry* 55, 1134-1141 (2016); and (ii) Huang, Y., Qin, W., Li, Z. & Li, Y. Enhanced stability and CO2 affinity of a UiO-66 type metal-organic framework decorated with dimethyl groups. *Dalton Transactions* 41, 9283-9285 (2012), each incorporated herein by reference in their entirety.

Thus, Bisallyloxy-UiO-66 MOF was designed, synthesized, characterized and tested for carbon dioxide capture and separation. The Bisallyloxy-UiO-66 has high $CO_2$ capture (50 cc/g) compared to $CH_4$ (9.8 cc/g) and $N_2$ (2.4 cc/g) at 298 K and 1 Bar respectively. The isosteric heats of adsorption ($Q_{st}$) is 27.60 kJ mol$^{-1}$ which demonstrates the material's physisorption affinity towards $CO_2$ and as a candidate for $CO_2$ capture. Furthermore, single component isotherms by Henry's law calculation provided selectivities of 63 for $CO_2/N_2$ and 16 for $CO_2/CH_4$. Thus this material has a great potential in industrial application in carbon dioxide sequestration.

The invention claimed is:

1. A zirconium metal-organic framework, which is a coordination product formed between:
   zirconium ion clusters; and
   a linker that links together adjacent zirconium ion clusters;
   wherein the linker is of formula (I)

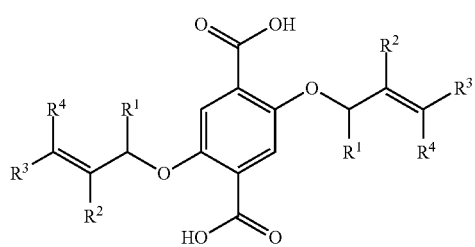

(I)

wherein:
   $R^1$ is hydrogen or an optionally substituted alkyl, and
   $R^2$ to $R^4$ are independently hydrogen, an optionally substituted alkyl, an optionally substituted aryl, or an optionally substituted arylalkyl.

2. The zirconium metal-organic framework of claim 1, wherein $R^1$ is hydrogen.

3. The zirconium metal-organic framework of claim 1, wherein $R^2$ to $R^4$ are each hydrogen.

4. The zirconium metal-organic framework of claim 1, wherein the linker is

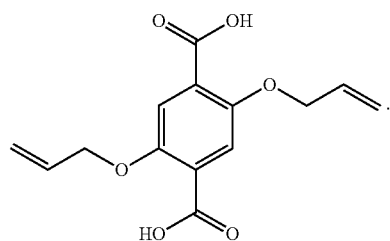 [SMILES: C=CCOc1cc(C(=O)O)c(OCC=C)cc1C(=O)O]

5. The zirconium metal-organic framework of claim 1, which has a zirconium ion to linker molecular ratio of 0.5:1 to 2:1.

6. The zirconium metal-organic framework of claim 1, wherein the zirconium ion clusters are of formula $[Zr_6O_4(OH)_4]^{12+}$.

7. The zirconium metal-organic framework of claim 1, which is isoreticular with metal-organic framework UiO-66.

8. The zirconium metal-organic framework of claim 1, which has a BET surface area of 300 to 600 m$^2$/g.

9. The zirconium metal-organic framework of claim 1, which has a pore volume of 0.1 to 0.25 cm$^3$/g.

10. The zirconium metal-organic framework of claim 1, which has a $CO_2$ uptake capacity of 75 to 90 cm$^3$/g at 273 K, 40 to 60 cm$^3$/g at 298 K, and 20 to 35 cm$^3$/g at 313 K, each at 760 Torr.

11. The zirconium metal-organic framework of claim 1, which has an ideal selectivity of $CO_2/N_2$ of 55 to 75, and an ideal selectivity of $CO_2/CH_4$ of 10 to 22.

12. A method of making the zirconium metal-organic framework of claim 1, the method comprising:
   mixing a zirconium(IV) salt and the linker of formula (I) in a polar aprotic solvent to form a complexation mixture; and
   heating the complexation mixture at 100 to 150° C. for 12 to 72 hours.

13. The method of claim 12, wherein a concentration of the zirconium(IV) salt in the complexation mixture is 0.01 to 0.03 M and a concentration of the linker of formula (I) in the complexation mixture is 0.005 to 0.025 M.

14. The method of claim 12, wherein the zirconium(IV) salt is $ZrCl_4$ and the polar aprotic solvent is dimethylformamide.

15. A method of capturing $CO_2$ from a gas mixture, the method comprising:
   contacting the gas mixture with the zirconium metal-organic framework of claim 1 to adsorb at least a portion of the $CO_2$ into the zirconium metal-organic framework, thereby forming a loaded zirconium metal-organic framework and a gas stream depleted in $CO_2$ compared to the gas mixture.

16. The method of claim 15, wherein the gas mixture further comprises at least one other gas selected from the group consisting of hydrogen, oxygen, nitrogen, methane, and carbon monoxide.

17. The method of claim 15, wherein the gas mixture is a pre-combustion gas mixture comprising 15 to 50 vol. % of $CO_2$, based on a total volume of the gas mixture.

18. The method of claim 15, wherein the gas mixture is a post-combustion gas mixture comprising 5 to 15 vol. % of $CO_2$, based on a total volume of the gas mixture.

19. The method of claim 15, wherein the gas mixture has a temperature of −5 to 50° C.

20. The method of claim 15, wherein the gas stream depleted in $CO_2$ contains at least 25% less $CO_2$ by volume compared to a volume of $CO_2$ present in the gas mixture.

* * * * *